US 11,485,389 B2
Nov. 1, 2022

(12) United States Patent
Lee et al.

(54) VEHICLE CONTROL METHOD

(71) Applicant: LG Electronics Inc., Seoul (KR)

(72) Inventors: Kyoungha Lee, Seoul (KR); Inyoung Hwang, Seoul (KR); Sungil Cho, Seoul (KR); Kangmin Kim, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 16/475,983

(22) PCT Filed: Apr. 2, 2019

(86) PCT No.: PCT/KR2019/003886
§ 371 (c)(1),
(2) Date: Jul. 3, 2019

(87) PCT Pub. No.: WO2020/204225
PCT Pub. Date: Oct. 8, 2020

(65) Prior Publication Data
US 2022/0024491 A1    Jan. 27, 2022

(51) Int. Cl.
B60W 60/00    (2020.01)
B60W 40/08    (2012.01)
(Continued)

(52) U.S. Cl.
CPC ........ B60W 60/0054 (2020.02); B60W 40/08 (2013.01); B60W 50/0205 (2013.01);
(Continued)

(58) Field of Classification Search
CPC combination set(s) only.
See application file for complete search history.

(56) References Cited

U.S. PATENT DOCUMENTS 11,079,753 B1*  8/2021  Roy ............... G05D 1/0278
2017/0028876 A1*  2/2017  Yamada ............... B60N 2/06
(Continued)

FOREIGN PATENT DOCUMENTS

KR    1020140043536    4/2014
KR    1020140084959    7/2014
(Continued)

OTHER PUBLICATIONS

KR Notice of Allowance in Korean Appln. No. 10-2019-7019053, dated Nov. 18, 2020, 4 pages (with English translation).
(Continued)

Primary Examiner — Jason Holloway
Assistant Examiner — Madison B Emmett
(74) Attorney, Agent, or Firm — Fish & Richardson P.C.

(57) ABSTRACT

A vehicle control method is disclosed. The vehicle control method includes: while controlling the driving of a vehicle taking control of itself, determining if there is a need to hand over the control of driving to a passenger in the vehicle; if it is determined that there is a need to hand over the control of driving to a passenger in the vehicle, selecting at least one of passengers to whom the control of driving may be handed over; determining an order of priority in handing over the control of driving by taking into consideration the at least one selected passenger's occupancy state information; handing over the control of driving to a top priority passenger according to the order of priority; and controlling the driving environment by taking into consideration the top priority passenger's occupancy state information.

19 Claims, 22 Drawing Sheets

(51) Int. Cl.
  *B60W 50/02* (2012.01)
  *B60W 50/08* (2020.01)
  *B60W 50/14* (2020.01)

(52) U.S. Cl.
  CPC .......... *B60W 50/082* (2013.01); *B60W 50/14* (2013.01); *B60W 60/0015* (2020.02); *B60W 2040/0809* (2013.01); *B60W 2040/0881* (2013.01); *B60W 2050/021* (2013.01); *B60W 2050/0215* (2013.01); *B60W 2050/146* (2013.01); *B60W 2540/227* (2020.02); *B60W 2556/45* (2020.02)

(56) References Cited

U.S. PATENT DOCUMENTS

| | | | |
|---|---|---|---|
| 2017/0101032 | A1 | 4/2017 | Sugioka et al. |
| 2018/0029548 | A1* | 2/2018 | Coburn ................. B60R 16/037 |
| 2018/0208210 | A1* | 7/2018 | Chapman ................. B62D 1/10 |
| 2018/0222490 | A1* | 8/2018 | Ishihara ................. B60K 35/00 |
| 2018/0251122 | A1* | 9/2018 | Golston ............ B60W 50/0098 |
| 2020/0101977 | A1* | 4/2020 | Nakai ................. G06K 9/00845 |

FOREIGN PATENT DOCUMENTS

| | | |
|---|---|---|
| KR | 20150083929 | 7/2015 |
| KR | 1020170015240 | 2/2017 |
| KR | 101779823 | 9/2017 |
| KR | 1020180042635 | 4/2018 |

OTHER PUBLICATIONS

International Search Report in International Appln. No. PCT/KR2019/003886, dated Jan. 6, 2020, 5 pages (with English translation).
Korean Office Action in Korean Appln. No. 10-2019-7019053, dated Jun. 16, 2020, 18 pages (with English translation).

* cited by examiner

VEHICLE CONTROL METHOD

CROSS-REFERENCE TO RELATED APPLICATIONS

This application is a National Stage application under 35 U.S.C. § 371 of International Application No. PCT/KR2019/003886, filed on Apr. 2, 2019, the disclosure of which is incorporated herein by reference in its entirety.

TECHNICAL FIELD

The present invention relates to a method for controlling a vehicle.

BACKGROUND ART

A vehicle may be classified as an internal combustion engine vehicle, an external combustion engine vehicle, a gas turbine vehicle, or an electric vehicle depending on the type of motor used.

In recent years, smart vehicles have been actively developed for the safety or convenience of drivers, pedestrians, etc., and active research is ongoing on sensors mounted on smart vehicles. Cameras, infrared sensors, radar, GPS, Lidar, gyroscopes, etc. are being used in smart vehicles, among which cameras serve to substitute for human eyes.

Due to the development of various types of sensors and electronic equipment, vehicles with functions for assisting a passenger in driving and improving the safety and convenience of driving are attracting attention.

Notably, a passenger's control of a vehicle during autonomous driving of the vehicle or in emergency situations is becoming an issue.

DISCLOSURE

Technical Problem

An aspect of the present invention is to provide a method for controlling a vehicle.

Another aspect of the present invention is to provide a method in which a passenger takes over control of driving from a driving vehicle taking control of itself.

Another aspect of the present invention is to provide a method in which, if there are a plurality of passengers within a vehicle, an order of priority in handing over control of driving is set.

Another aspect of the present invention is to provide a method of changing the layout of a seat in a vehicle depending on the seating position of a passenger taking over control of driving.

Another aspect of the present invention is to provide a method in which a passenger who has taken over control of driving from a vehicle controls the driving of the vehicle.

Technical Solution

An exemplary embodiment of the present invention provides a vehicle control method including: while controlling the driving of a vehicle taking control of itself, determining if there is a need to hand over the control of driving to a passenger in the vehicle; if it is determined that there is a need to hand over the control of driving to a passenger in the vehicle, selecting at least one of passengers to whom the control of driving may be handed over; determining an order of priority in handing over the control of driving by taking into consideration the at least one selected passenger's occupancy state information; handing over the control of driving to a top priority passenger according to the order of priority; and controlling the driving environment by taking into consideration the top priority passenger's occupancy state information.

The control of driving may include control of at least one among steering control of the vehicle, acceleration control of the vehicle, brake control of the vehicle, light control of the vehicle, and wiper control of the vehicle.

Upon detecting a glitch in a sensor for acquiring information on the surroundings of the vehicle, it may be determined that there is a need to hand over the control of driving to a passenger in the vehicle.

Upon receiving from an external server a command to hand over the control of driving to a passenger in the vehicle, it may be determined that there is a need to hand over the control of driving to a passenger in the vehicle.

At least one passenger to whom the control of driving may be handed over may be selected based on at least one of the following: whether the passenger has a driver's license, whether the passenger is drunk, the passenger's driving experience, whether the passenger is sleeping, and whether the passenger is on the phone.

The vehicle control method may further include receiving reserved input information from the passenger before the passenger gets in the vehicle, wherein the reserved input information may include whether the passenger consents to take over the control of driving, and the at least one selected passenger may only include a passenger who consents to take over the control of driving.

The vehicle control method may further include, if there is no passenger to which the control of driving may be handed over, bringing the vehicle to an emergency stop.

The vehicle may include at least one among a forward-facing seat, a backward-facing seat, and a sideways-facing seat all relative to the direction of travel, and the order of priority in handing over the control of driving is: a passenger in the forward-facing seat; a passenger in the backward-facing seat; and a passenger in the sideways-facing seat.

The vehicle control method may further include, once the control of driving is handed over to the top priority passenger, outputting a driving control handover notification to the top priority passenger.

The vehicle control method may further include, upon detecting that the top priority passenger is sitting in a forward-facing seat relative to the direction of travel of the vehicle, enabling a display that covers a front window of the vehicle and displaying information on the surroundings of the vehicle on the display.

The vehicle control method may further include, upon detecting that the top priority passenger is sitting in a forward-facing seat relative to the direction of travel of the vehicle, moving the forward-facing seat in the direction of travel.

The vehicle control method may further include, upon detecting that the top priority passenger is sitting in a forward-facing seat relative to the direction of travel of the vehicle, moving the forward-facing seat in a left and right direction.

The vehicle control method may further include, upon detecting that the top priority passenger is sitting in a backward-facing seat or sideways-facing seat relative to the direction of travel of the vehicle, rotating the backward-facing seat so that the backward-facing seat or sideways-facing seat faces forward relative to the direction of travel of the vehicle.

The vehicle control method may further include, upon detecting that the top priority passenger is sitting in a backward-facing seat or sideways-facing seat relative to the direction of travel of the vehicle, guiding the top priority passenger to sit in a forward-facing seat relative to the direction of travel of the vehicle.

The vehicle control method may further include, upon detecting that the top priority passenger is sitting in a backward-facing seat relative to the direction of travel of the vehicle, displaying to the backward-facing seat an image corresponding to the direction of travel of the vehicle on a display installed in the opposite direction to the direction of travel of the vehicle.

The vehicle control method may further include, upon detecting that the top priority passenger is sitting in a sideways-facing seat relative to the direction of travel of the vehicle, guiding the top priority passenger to wear a VR (virtual reality device) provided within the vehicle.

The vehicle control method may further include controlling the driving of the vehicle based on a gesture input from the top priority passenger.

The vehicle control method may further include receiving reserved input information from the passenger before the passenger gets in the vehicle, wherein an order of priority in handing over the control of driving may be preset based on the reserved input information.

The reserved input information may include at least one of the following: whether the passenger consents to take over control of driving, whether the passenger has a driver's license, whether the passenger is drunk, the passenger's driving experience, seat choice information, travel time, the time the passenger gets in the vehicle, the time the passenger gets out of the vehicle, the location where the passenger gets in the vehicle, and the location where the passenger gets out of the vehicle.

The vehicle control method may further include updating the order of priority in handing over the control of driving based on the passenger's occupancy state information after the passenger gets in the vehicle.

Advantageous Effects

A vehicle control device according to the present invention has the following advantages.

According to at least one exemplary embodiment of the present invention, it is possible to provide a method in which a passenger takes over control of driving from a driving vehicle taking control of itself.

According to at least one exemplary embodiment of the present invention, it is possible to provide a method in which, if there are a plurality of passengers within a vehicle, an order of priority in handing over control of driving is set.

According to at least one exemplary embodiment of the present invention, it is possible to provide a method of changing the layout of a seat in a vehicle depending on the seating position of a passenger taking over control of driving.

According to at least one exemplary embodiment of the present invention, it is possible to provide a method in which a passenger who has taken over control of driving from a vehicle controls the driving of the vehicle.

MODE FOR INVENTION

Figure 1:
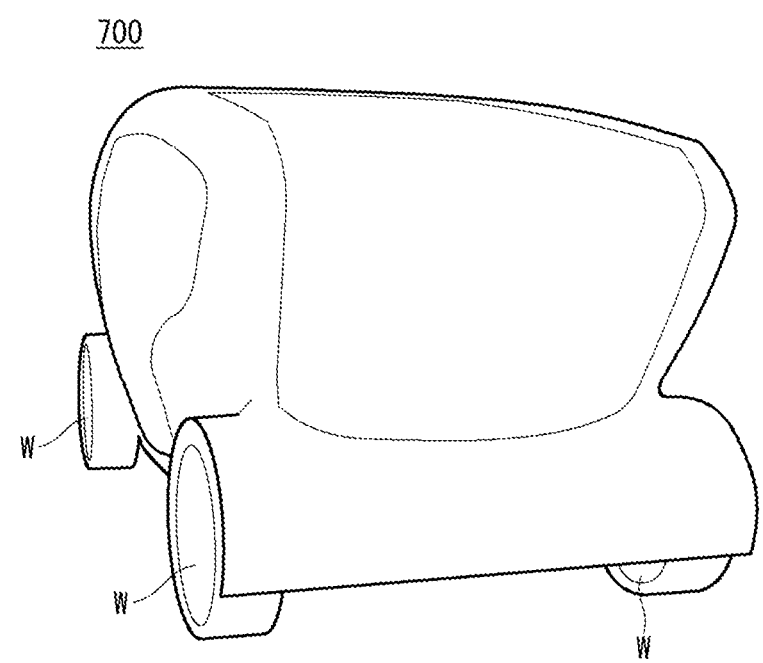
FIG. 1 shows an exterior appearance of a vehicle with a vehicle control device according to an exemplary embodiment of the present invention.
Figure 1:
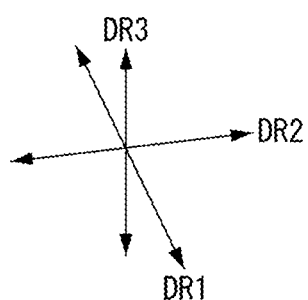

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A vehicle as described in this specification may include a car and a motorcycle.

Hereinafter, a car will be as an example of a vehicle.

A vehicle as described in this specification may include all of an internal combustion engine vehicle including an engine as a power source, a hybrid vehicle including both an engine and an electric motor as a power source, and an electric vehicle including an electric motor as a power source.

In some implementations, the left of a vehicle means the left of the vehicle in the direction of travel and the right of the vehicle means the right of the vehicle in the direction of travel.

In some implementations, a left hand drive (LHD) vehicle will be assumed unless otherwise stated.

Hereinafter, a user, a driver, a passenger, and a fellow passenger may be used interchangeably depending on the embodiment.

In the following description, a vehicle control device 400 is a separate device provided in a vehicle 700, and may exchange necessary information with the vehicle 700 through data communication. The vehicle control device 400 may include at least some of the units of the vehicle 700. The vehicle control device 400 may be referred to as a control device 400, a driving assistance device 400, a vehicle driving assistance device 400, or an assistance device 400.

Alternatively, at least some of the units of the vehicle control device 400 may be a unit(s) of the vehicle 700 or of another device mounted in the vehicle 700. Such external units may be understood as being included in the vehicle control device 400 by transmitting and receiving data through an interface unit of the vehicle control device 400.

FIG. 1 shows an exterior appearance of a vehicle with a vehicle control device according to an exemplary embodiment of the present invention Referring to FIG. 1, the vehicle 700 may include wheels W that rotate by a source of power. A first direction DR1 may be referred to as a forward and backward direction. The vehicle 700 may move forward or backward in the first direction DR1. A second direction DR2 may be perpendicular to the first direction DR1. The second direction DR2 may be referred to as a left and right direction. A third direction DR3 may be perpendicular to the first direction DR1 or second direction DR2. The third direction DR3 may be referred to as an upward and downward direction.

Figure 2:
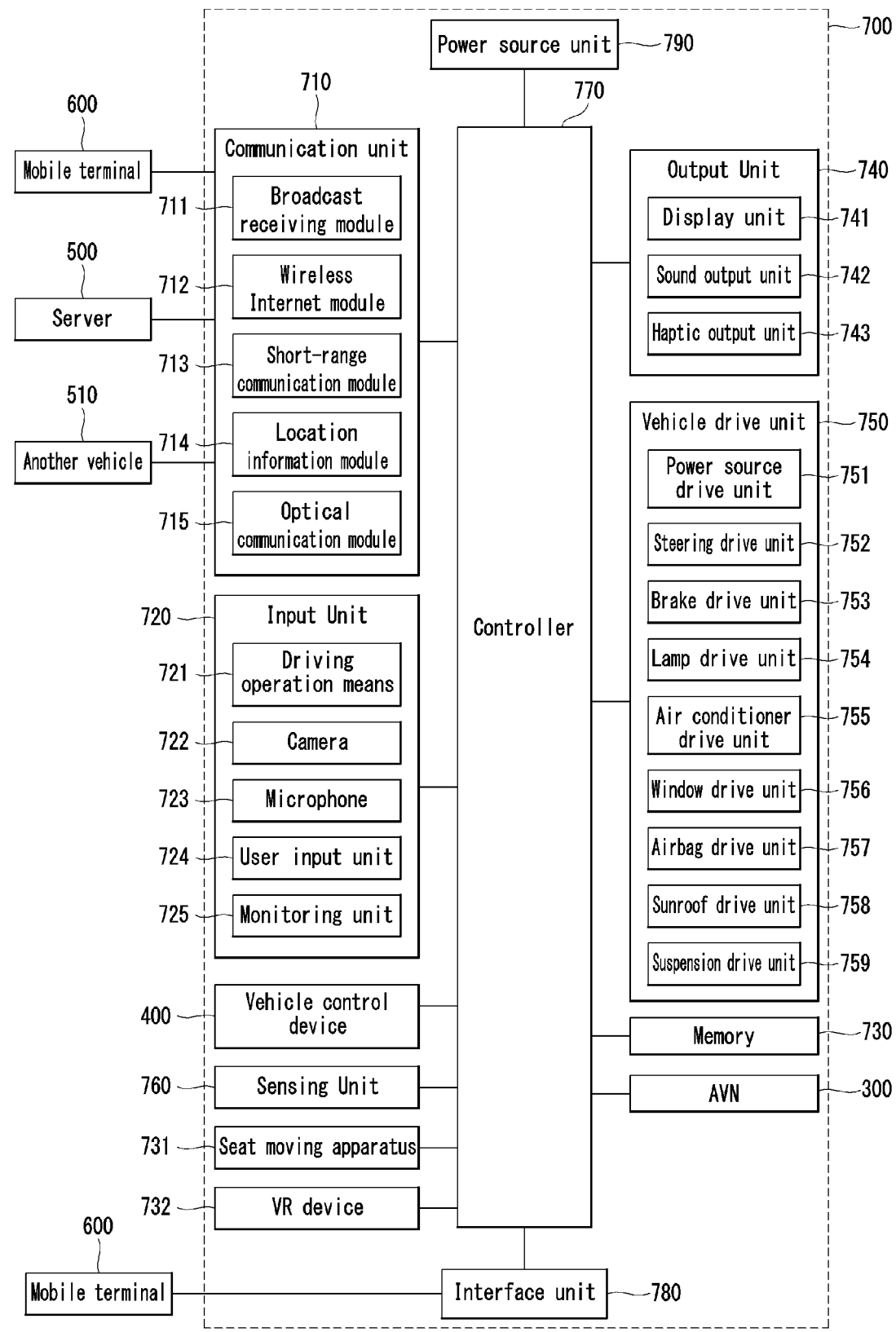
FIG. 2 is an example of an internal block diagram of the vehicle.

FIG. 2 is a block diagram illustrating one example of the vehicle 700 of FIG. 1.

The vehicle 700 may include the communication unit 710, the input unit 720, the sensing unit 760, an output unit 740, a vehicle drive unit 750, a memory 730, an interface unit 780, the controller 770, the power source unit 790, the vehicle control device 400, and the AVN apparatus 300. The communication unit 710 may include one or more modules to enable the wireless communication between the vehicle 700 and the mobile terminal 600, between the vehicle 700 and the external server 500, or between the vehicle 700 and another vehicle 510. In addition, the communication unit 710 may include one or more modules to connect the vehicle 700 to one or more networks.

The communication unit 710 may include a broadcast receiving module 711, a wireless Internet module 712, a short-range communication module 713, a location information module 714, and an optical communication module 715.

The broadcast receiving module 711 is configured to receive a broadcast signal or broadcast associated information from an external broadcast managing server via a broadcast channel. Here, broadcast includes radio broadcast or TV broadcast.

The wireless Internet module 712 is a module for wireless Internet access. The wireless Internet module 712 may be internally or externally coupled to the vehicle 700. The wireless Internet module 712 may transmit or receive wireless signals via communication networks according to wireless Internet technologies.

Examples of such wireless Internet technologies include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), and LTE-A (Long Term Evolution-Advanced). The wireless Internet module 712 may transmit and receive data according to one or more of such wireless Internet technologies, and other Internet technologies as well. For example, the wireless Internet module 712 may exchange data with the external server 500 in a wireless manner. The wireless Internet module 712 may receive weather information and road traffic state information (e.g., Transport Protocol Expert Group (TPEG) information) from the external server 500.

The short-range communication module 713 may assist short-range communication using at least one selected from among Bluetooth™, Radio Frequency Identification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication module 713 forms wireless area networks to perform the short-range communication between the vehicle 700 and at least one external device. For example, the short-range communication module 713 may exchange data with the mobile terminal 600 in a wireless manner. The short-range communication module 713 may receive weather information and road traffic state information (e.g., Transport Protocol Expert Group (TPEG) information) from the mobile terminal 600. When the user gets into the vehicle 700, the mobile terminal 600 of the user and the vehicle 700 may pair with each other automatically or as the user executes a pairing application.

The location information module 714 is a module to acquire a location of the vehicle 700. A representative example of the location information module 714 includes a Global Position System (GPS) module. For example, when the vehicle utilizes a GPS module, a location of the vehicle may be acquired using signals transmitted from GPS satellites.

The optical communication module 715 may include a light emitting unit and a light receiving unit.

The light receiving unit may convert light into electrical signals to receive information. The light receiving unit may include Photo Diodes (PDs) to receive light. The photo diodes may convert light into electrical signals. For example, the light receiving unit may receive information regarding a preceding vehicle via light emitted from a light source included in the preceding vehicle.

The light emitting unit may include at least one light emitting element to convert electrical signals into light.

Here, the light emitting element may be a Light Emitting Diode (LED). The light emitting unit converts electrical signals into light to thereby emit the light. For example, the light emitting unit may externally emit light via flickering of the light emitting element corresponding to a prescribed frequency. In some embodiments, the light emitting unit may include an array of a plurality of light emitting elements. In some embodiments, the light emitting unit may be integrated with a lamp provided in the vehicle 700. For example, the light emitting unit may be at least one selected from among a headlight, a taillight, a brake light, a turn signal light, and a sidelight. For example, the optical communication module 715 may exchange data with another vehicle 510 via optical communication.

The input unit 720 may include a driving operation unit 721, a camera 722, a microphone 723, and a user input unit 724.

The driving operation unit 721 is configured to receive user input for the driving of the vehicle 700. The driving operation unit 721 may include a steering input unit, a shift input unit, an acceleration input unit, and a brake input unit.

The camera 722 may include an image sensor and an image processing module. The camera 722 may process a still image or a moving image acquired by the image sensor (e.g., a CMOS or a CCD). The image processing module may extract required information by processing a still image or a moving image acquired via the image sensor and, then, may transmit the extracted information to the controller 770. Meanwhile, the vehicle 700 may include the camera 722 to capture a forward image or a surround-view image of the vehicle and a monitoring unit 725 to capture an image of the interior of the vehicle.

The monitoring unit 725 may capture an image of a passenger. The monitoring unit 725 may capture an image of biometrics of the passenger.

The microphone 723 may process external sound signals into electrical data. The processed data may be utilized in various ways according to a function that the vehicle 700 is performing. The microphone 723 may convert a user voice command into electrical data. The converted electrical data may be transmitted to the controller 770.

Meanwhile, in some embodiments, the camera 722 or the microphone 723 may be components of the sensing unit 760, other than components of the input unit 720.

The user input unit 724 is configured to receive information from the user. When information is input via the user input unit 724, the controller 770 may control the operation of the vehicle 700 to correspond to the input information. The user input unit 724 may include a touch input unit or a mechanical input unit. In some embodiments, the user input unit 724 may be located in a region of the steering wheel. In this case, the driver may operate the user input unit 724 with the fingers while gripping the steering wheel.

The sensing unit 760 is configured to sense signals associated with, for example, the traveling of the vehicle 700. To this end, the sensing unit 760 may include a collision sensor, a steering sensor, a speed sensor, gradient sensor, a weight sensor, a heading sensor, a yaw sensor, a gyro sensor, a position module, a vehicle forward/backward movement sensor, a battery sensor, a fuel sensor, a tire sensor, a steering sensor based on the rotation of a steering wheel, a vehicle interior temperature sensor, a vehicle interior humidity sensor, an ultrasonic sensor, an infrared sensor, a radar, and Lidar.

As such, the sensing unit 760 may acquire sensing signals with regard to, for example, vehicle collision information, vehicle traveling direction information, vehicle location information (GPS information), vehicle angle information, vehicle speed information, vehicle acceleration information, vehicle tilt information, vehicle forward/backward movement information, battery information, fuel information, tire information, vehicle lamp information, vehicle interior temperature information, vehicle interior humidity information, and steering wheel rotation angle information.

Meanwhile, the sensing unit 760 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The sensing unit 760 may include a biometric information sensing unit. The biometric information sensing unit is configured to sense and acquire biometric information of the passenger. The biometric information may include fingerprint information, iris-scan information, retina-scan information, hand geometry information, facial recognition information, and voice recognition information. The biometric information sensing unit may include a sensor to sense biometric information of the passenger. Here, the monitoring unit 725 and the microphone 723 may operate as sensors. The biometric information sensing unit may acquire hand geometry information and facial recognition information via the monitoring unit 725.

The output unit 740 is configured to output information processed in the controller 770. The output unit 740 may include a display unit 741, a sound output unit 742, and a haptic output unit 743.

The display unit 741 may display information processed in the controller 770. For example, the display unit 741 may display vehicle associated information. Here, the vehicle associated information may include vehicle control information for the direct control of the vehicle or driver assistance information to guide vehicle driving. In addition, the vehicle associated information may include vehicle state information that notifies a current state of the vehicle or vehicle traveling information regarding the traveling of the vehicle.

The display unit 741 may include at least one selected from among a Liquid Crystal Display (LCD), a Thin Film Transistor LCD (TFT LCD), an Organic Light Emitting Diode (OLED), a flexible display, a 3D display, and an e-ink display.

The display unit 741 may configure an inter-layer structure with a touch sensor, or may be integrally formed with the touch sensor to implement a touchscreen. The touchscreen may function as the user input unit 724 which provides an input interface between the vehicle 700 and the user and also function to provide an output interface between the vehicle 700 and the user. In this case, the display unit 741 may include a touch sensor which senses a touch to the display unit 741 so as to receive a control command in a touch manner.

When a touch is input to the display unit 741 as described above, the touch sensor may sense the touch and the controller 770 may generate a control command corresponding to the touch. Content input in a touch manner may be characters or numbers, or may be, for example, instructions in various modes or menu items that may be designated.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like. Hereinafter, a touch or a touch input may generally refer to various types of touches mentioned above.

Meanwhile, the display unit 741 may include a cluster to allow the driver to check vehicle state information or vehicle traveling information while driving the vehicle. The cluster may be located on a dashboard. In this case, the driver may check information displayed on the cluster while looking forward.

Meanwhile, in some embodiments, the display unit 741 may be implemented as a Head Up display (HUD). When the display unit 741 is implemented as a HUD, information may be output via a transparent display provided at the windshield. Alternatively, the display unit 741 may include a projector module to output information via an image projected to the windshield.

The sound output unit 742 is configured to convert electrical signals from the controller 770 into audio signals and to output the audio signals. To this end, the sound output unit 742 may include, for example, a speaker. The sound output unit 742 may output sound corresponding to the operation of the user input unit 724.

The haptic output unit 743 is configured to generate tactile output. For example, the haptic output unit 743 may operate to vibrate a steering wheel, a safety belt, or a seat so as to allow the user to recognize an output thereof.

The vehicle drive unit 750 may control the operation of various devices of the vehicle. The vehicle drive unit 750 may include at least one of a power source drive unit 751, a steering drive unit 752, a brake drive unit 753, a lamp drive unit 754, an air conditioner drive unit 755, a window drive unit 756, an airbag drive unit 757, a sunroof drive unit 758, and a suspension drive unit 759.

The power source drive unit 751 may perform electronic control for a power source inside the vehicle 700. For example, in the case where a fossil fuel based engine (not illustrated) is a power source, the power source drive unit 751 may perform electronic control for the engine. As such, the power source drive unit 751 may control, for example, an output torque of the engine. In the case where the power source drive unit 751 is the engine, the power source drive unit 751 may control the speed of the vehicle by controlling the output torque of the engine under the control of the controller 770. In another example, when an electric motor (not illustrated) is a power source, the power source drive unit 751 may perform control for the motor. As such, the power source drive unit 751 may control, for example, the RPM and torque of the motor.

The steering drive unit 752 may include a steering apparatus. Thus, the steering drive unit 752 may perform electronic control for a steering apparatus inside the vehicle 700.

The brake drive unit 753 may perform electronic control of a brake apparatus (not illustrated) inside the vehicle 700. For example, the brake drive unit 753 may reduce the speed of the vehicle 700 by controlling the operation of brakes located at wheels. In another example, the brake drive unit 753 may adjust the direction of travel of the vehicle 700 leftward or rightward by differentiating the operation of respective brakes located at left and right wheels.

The lamp drive unit 754 may turn at least one lamp arranged inside and outside the vehicle 700 on or off. The lamp drive unit 754 may include a lighting apparatus. In addition, the lamp drive unit 754 may control, for example, the intensity and direction of light of each lamp included in the lighting apparatus. For example, the lamp drive unit 754 may perform control for a turn signal lamp, a headlamp or a brake lamp.

The air conditioner drive unit 755 may perform the electronic control of an air conditioner (not illustrated) inside the vehicle 700. For example, when the interior temperature of the vehicle 700 is high, the air conditioner drive unit 755 may operate the air conditioner to supply cold air to the interior of the vehicle 700.

The window drive unit 756 may perform the electronic control of a window apparatus inside the vehicle 700. For example, the window drive unit 756 may control the opening or closing of left and right windows of the vehicle 700.

The airbag drive unit 757 may perform the electronic control of an airbag apparatus inside the vehicle 700. For example, the airbag drive unit 757 may control an airbag to be deployed in a dangerous situation.

The sunroof drive unit 758 may perform electronic control of a sunroof apparatus inside the vehicle 700. For example, the sunroof drive unit 758 may control the opening or closing of a sunroof.

The suspension drive unit 759 may perform electronic control on a suspension apparatus (not shown) inside the vehicle 700. For example, when the road surface is uneven, the suspension drive unit may control the suspension apparatus to reduce vibration of the vehicle 700.

The memory 730 is electrically connected to the controller 770. The memory 730 may store basic data for each unit, control data for the operation control of the unit, and input/output data. The memory 730 may be various hardware storage devices such as, for example, a ROM, a RAM, an EPROM, a flash drive, and a hard drive. The memory 730 may store various data for the overall operation of the vehicle 700 such as, for example programs for the processing or control of the controller 770.

The interface unit 780 may serve as a passage for various kinds of external devices that are connected to the vehicle 700. For example, the interface unit 780 may have a port that is connectable to the mobile terminal 600 and may be connected to the mobile terminal 600 via the port. In this case, the interface unit 780 may exchange data with the mobile terminal 600.

Meanwhile, the interface unit 780 may serve as a passage for the supply of electrical energy to the connected mobile terminal 600. When the mobile terminal 600 is electrically connected to the interface unit 780, the interface unit 780 supplies electrical energy from the power source unit 790 to the mobile terminal 600 under the control of the controller 770.

The controller 770 may control the overall operation of each unit inside the vehicle 700. The controller 770 may be referred to as an Electronic Control Unit (ECU).

The controller 770 may execute a function corresponding to an execution signal delivered from the vehicle control device 400.

The controller 770 may be implemented in a hardware manner using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

The power source unit 790 may supply power required to operate the respective components under the control of the controller 770. In particular, the power source unit 790 may receive power from, for example, a battery (not illustrated) inside the vehicle 700.

The AVN apparatus 300 may exchange data with the controller 770. The controller 770 may receive navigation information from the AVN apparatus 300 or a separate navigation apparatus (not illustrated). Here, the navigation information may include set destination information, destination based routing information, and map information or vehicle location information related to vehicle traveling.

The vehicle control device 400 may be understood as included in the vehicle 700.

A seat moving apparatus 731 may be referred to as a seat moving system 731 or seating system 731. The seat moving apparatus 731 may move or rotate a seat inside the vehicle 700. The seat moving apparatus 731 may control a seating arrangement by moving or rotating a seat inside the vehicle 700.

Figure 3:
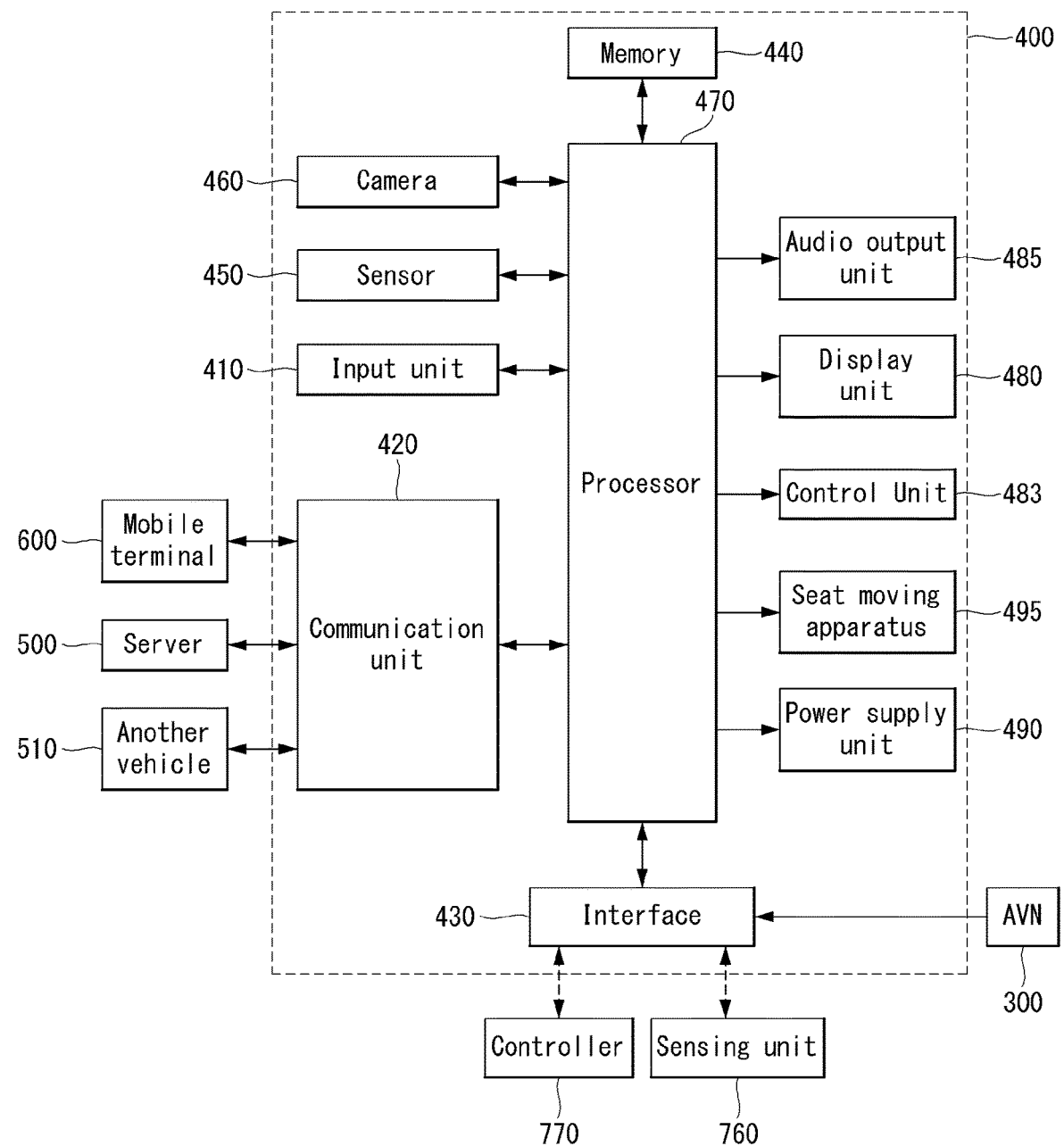
FIG. 3 is an example of an internal block diagram of the vehicle control device according to an exemplary embodiment of the present invention.

FIG. 3 is an example of an internal block diagram of the vehicle control device according to an exemplary embodiment of the present invention.

Referring to FIG. 3, the vehicle control device 400 may include an input unit 410, a communication unit 420, an interface 430, a memory 440 a camera 460, a sensor unit 450, a processor 470, a display unit 480, an audio output unit 485, and a power supply unit 490. However, the units of the vehicle control device 400 of FIG. 3 are unnecessary to realize the vehicle control device 400. Thus, the vehicle control device 400 described in this specification may include additional components in addition to the above-described components, or a portion of the above-described components may be omitted.

Each component will now be described in detail. The vehicle control device 400 may include the input unit 410 for receiving user input.

The input unit 410 may include at least one of a gesture input unit (e.g., an optical sensor, etc.) for sensing a user gesture, a touch input unit (e.g., a touch sensor, a touch key, a push key (mechanical key), etc.) for sensing touch, and a microphone for sensing voice input and receive user input.

Next, the vehicle control device 400 may include the communication unit 420 for communicating with another vehicle 510, a terminal 600 and a server 500. The communication unit 420 may be referred to as a wireless communication unit 420.

The vehicle control device 400 may receive communication information including at least one of navigation information, another vehicle 510's traveling information, and traffic information through the communication unit 420. The vehicle control device 400 may send information about the vehicle 700 through the communication unit 420.

The communication unit 420 may receive at least one of position information, weather information and road traffic condition information (e.g., transport protocol experts group (TPEG), etc.) from the mobile terminal 600 and/or the server 500.

The communication unit 420 may receive traffic information from the server 500 having an intelligent traffic system (ITS). Here, the traffic information may include traffic signal information, lane information, vehicle surrounding information or position information.

In addition, the communication unit 420 may receive navigation information from the server 500 and/or the mobile terminal 600. Here, the navigation information may include at least one of map information related to vehicle driving, lane information, vehicle position information, set destination information and route information according to the destination.

For example, the communication unit 420 may receive the real-time position of the vehicle as the navigation information. In detail, the communication unit 420 may include a global positioning system (GPS) module and/or a Wi-Fi (Wireless Fidelity) module and acquire the position of the vehicle.

In addition, the communication unit 420 may receive driving information of another vehicle 510 from the another vehicle 510 and transmit information on this vehicle, thereby sharing driving information between vehicles. Here, the shared driving information may include vehicle traveling direction information, position information, vehicle speed information, acceleration information, moving route information, forward/reverse information, adjacent vehicle information and turn signal information.

In addition, when a user rides in the vehicle, the mobile terminal 600 of the user and the vehicle control device 400 may pair with each other automatically or by executing a user application.

The communication unit 420 may exchange data with the another vehicle 510, the mobile terminal 600 or the server 500 in a wireless manner.

In detail, the communication unit 420 may perform wireless communication using a wireless data communication method. As the wireless data communication method, technical standards or communication methods for mobile communications (for example, Global System for Mobile Communication (GSM), Code Division Multiple Access (CDMA), CDMA2000 (Code Division Multiple Access 2000), EV-DO (Evolution-Data Optimized), Wideband CDMA (WCDMA), High Speed Downlink Packet Access (HSDPA), HSUPA (High Speed Uplink Packet Access), Long Term Evolution (LTE), LTE-A (Long Term Evolution-Advanced), and the like) may be used.

In addition, the communication unit 420 is configured to facilitate short-range communication. For example, short-range communication may be supported using at least one of Bluetooth™, Radio Frequency Identification (RFID), Infrared Data Association (IrDA), Ultra-Wideband (UWB), Zig-Bee, Near Field Communication (NFC), Wireless-Fidelity (Wi-Fi), Wi-Fi Direct, Wireless USB (Wireless Universal Serial Bus), and the like.

In addition, the vehicle control device 400 may pair with the mobile terminal located inside the vehicle using a short-range communication method and wirelessly exchange data with the other vehicle 510 or the server 500 using a long-distance wireless communication module of the mobile terminal.

Next, the vehicle control device 400 may include the interface 430 for receiving data of the vehicle and transmitting a signal processed or generated by the processor 470.

The vehicle control device 400 may receive at least one of driving information of another vehicle, navigation information and sensor information via the interface 430. To this end, the interface 430 may perform data communication with at least one of the controller 770 of the vehicle, an audio-video-navigation (AVN) apparatus 300, and the sensing unit 760 using a wired or wireless communication method. The interface 430 may receive navigation information by data communication with the controller 770, the AVN apparatus 300 and/or a separate navigation apparatus.

In addition, the interface 430 may receive sensor information from the controller 770 or the sensing unit 760.

Here, the sensor information may include at least one of vehicle traveling direction information, vehicle position information, vehicle speed information, acceleration information, vehicle tilt information, forward/reverse information, fuel information, information on a distance from a preceding/rear vehicle, information on a distance between a vehicle and a lane and turn signal information, etc.

The sensor information may be acquired from a heading sensor, a yaw sensor, a gyro sensor, a position module, a vehicle forward/reverse sensor, a wheel sensor, a vehicle speed sensor, a vehicle tilt sensor, a battery sensor, a fuel sensor, a tire sensor, a steering sensor on the basis of rotation of the steering wheel, a vehicle inside temperature sensor, a vehicle inside humidity sensor, a door sensor, etc. The position module may include a GPS module for receiving GPS information.

The interface 430 may receive user input via the user input unit 410 of the vehicle. The interface 430 may receive user input from the input unit of the vehicle or via the controller 770. That is, when the input unit is provided in the vehicle, user input may be received via the interface 430.

In addition, the interface 430 may receive traffic information acquired from the server. The server 500 may be located at a traffic control surveillance center for controlling traffic. For example, when traffic information is received from the server 500 via the communication unit 420 of the vehicle, the interface 430 may receive traffic information from the controller 770.

Next, the memory 440 may store a variety of data for overall operation of the vehicle control device 400, such as a program for processing or control of the processor 470.

In addition, the memory 440 may store data and commands for operation of the vehicle control device 400 and a plurality of application programs or applications executed in the vehicle control device 400. At least some of such application programs may be downloaded from an external server through wireless communication. At least one of such application programs may be installed in the vehicle control device 400 upon release. Such application programs may be stored in the memory 440, and may be executed to perform operation (or function) of the vehicle control device 400 by the processor 470.

The memory 440 may store data for checking an object included in an image. For example, the memory 440 may store data for checking a predetermined object using a predetermined algorithm when the predetermined object is detected from an image of the vicinity of the vehicle acquired through the camera 460. For example, the memory 440 may store data for checking a predetermined object such as a passenger, garbage, or a lost item from an image acquired through the camera 460.

The memory 440 may be implemented in a hardware manner using at least one selected from among a flash memory, a hard disk, a solid state drive (SSD), a silicon disk drive (SDD), a micro multimedia card, a card type memory (e.g., an SD or XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk and an optical disc.

In addition, the vehicle control device 400 may operate in association with a network storage for performing a storage function of the memory 440 over the Internet.

The sensor unit 450 may acquire information on the internal state of the vehicle 700. The sensor unit 450 may sense a thing or object within the vehicle 700. The camera 460 may capture the inside of the vehicle 700. Alternatively, the camera 460 may capture the vicinity of a seat installed in the vehicle. Alternatively, the camera 460 may capture a passenger in the vehicle 700.

The processor 470 may be referred to as a control unit 470 or a controller 470. The processor 470 may detect an object in the vicinity of the vehicle control device 400 through the camera 460. Alternatively, the processor 470 may detect a passenger, a passenger's belongings, or garbage through the camera 460. The processor 470 may control the operation of the vehicle control device 400.

A control unit 483 may receive input for controlling the driving of the vehicle 700. The control unit 483 may be a part of the input unit 410. For example, the control unit 483 may be a jog dial, button, or gesture receiver.

The seat moving apparatuses 731 and 495 may be identical.

Figure 4:
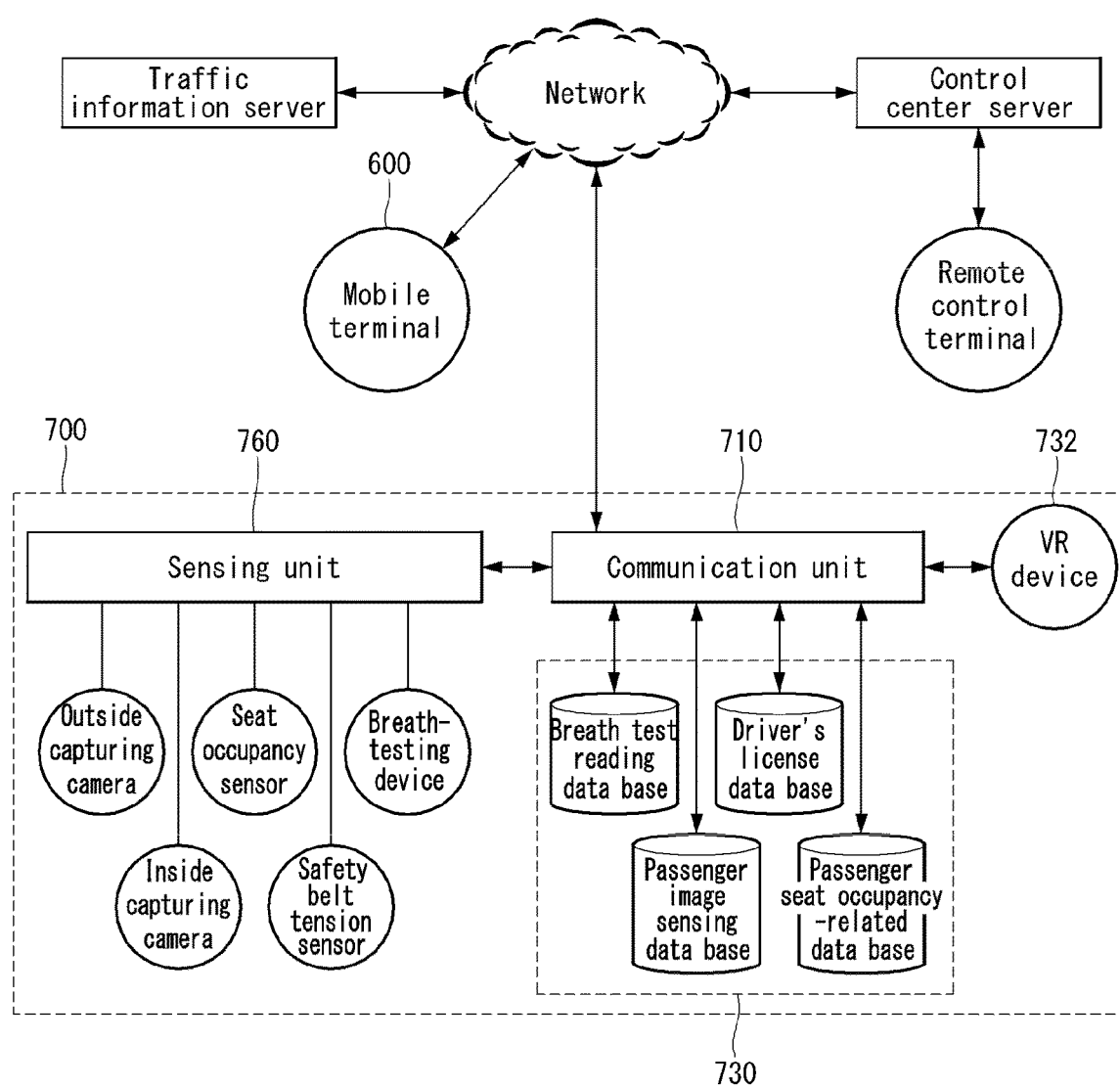
FIG. 4 is a view showing an example of a system according to an exemplary embodiment of the present invention.

FIG. 4 is a view showing an example of a system according to an exemplary embodiment of the present invention.

Referring to FIG. 4, a traffic information server, the mobile terminal 600, a control center server, a remote control terminal, and the communication unit 710 may establish a network. The traffic information server, the mobile terminal 600, the control center server, the remote control terminal, and the communication unit 710 may exchange information with one another. The traffic information server may provide driving information, traffic information, road information, etc. of another vehicle 510. The remote control terminal may control the mobile terminal 600 or vehicle 700 through the control center server.

The sensing unit 760 of the vehicle 700 may include a camera for capturing the outside of the vehicle 700, a camera for capturing the inside of the vehicle 700, a seat occupancy sensor, a safety belt tension sensor, and a breath-testing device. The seat occupancy sensor may detect whether a passenger is seated. The safety belt tension sensor may detect whether a passenger is wearing a safety belt. The breath-testing device may detect whether a passenger is drunk or detect or measure blood alcohol content through breath alcohol measurement.

The memory 730 may include a breath test reading database, a driver's license database, a passenger image sensing database, a passenger seat occupancy-related database.

A VR device (Virtual Reality Device) 732 may be provided within the vehicle 700.

Figure 5:
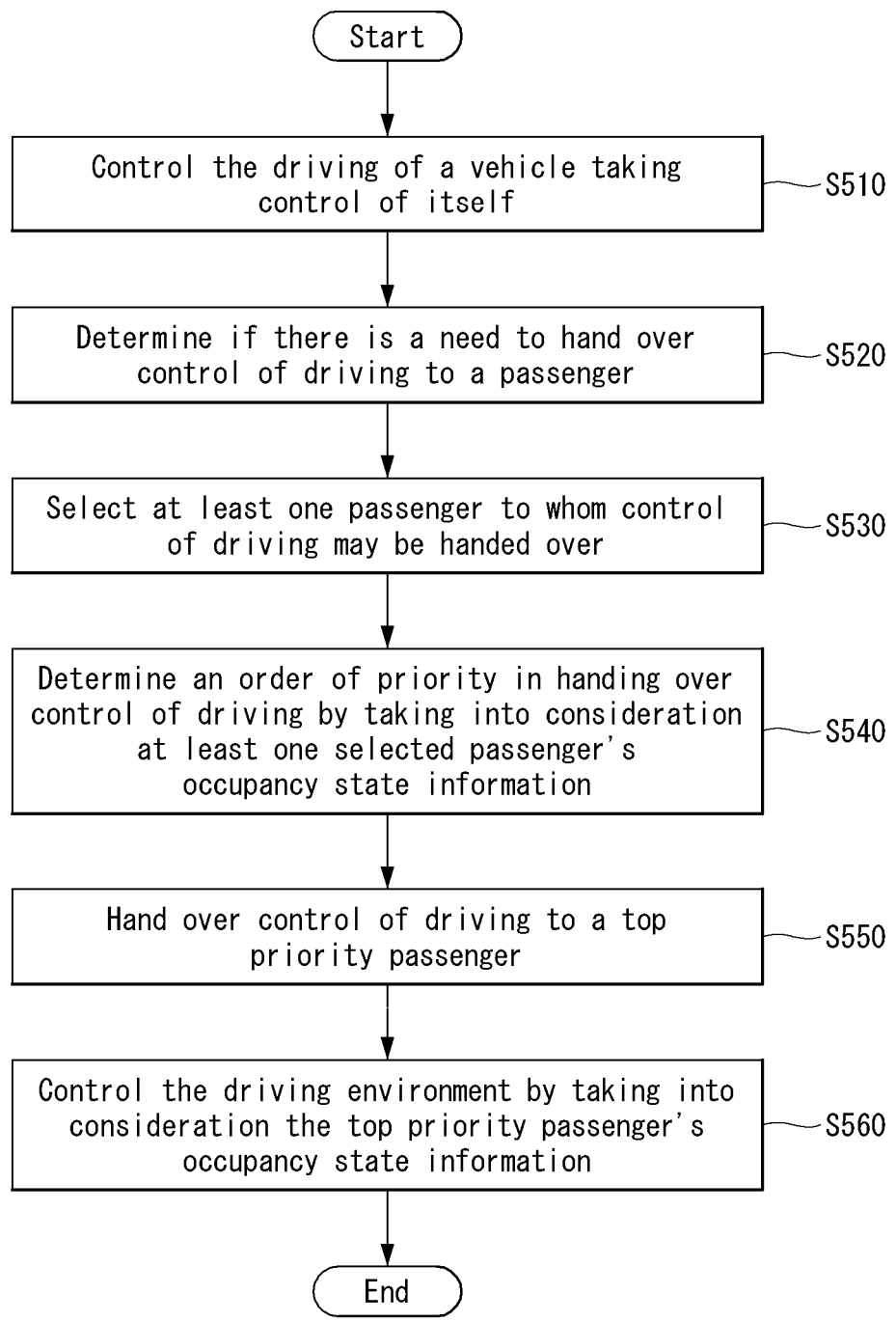
FIGS. 5 to 7 are views showing an example of handing over control of driving the vehicle.
Figure 6:
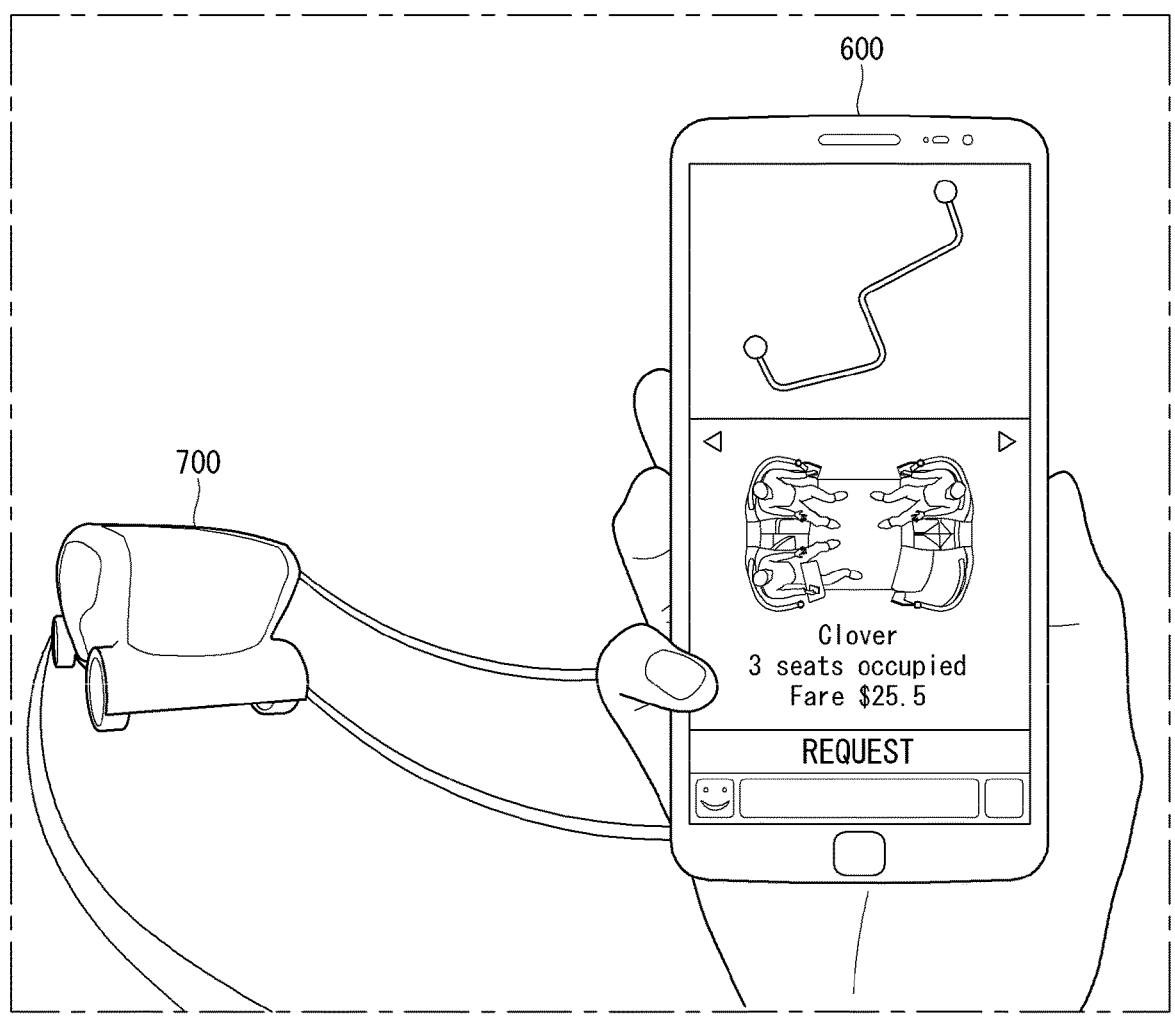
Figure 7:
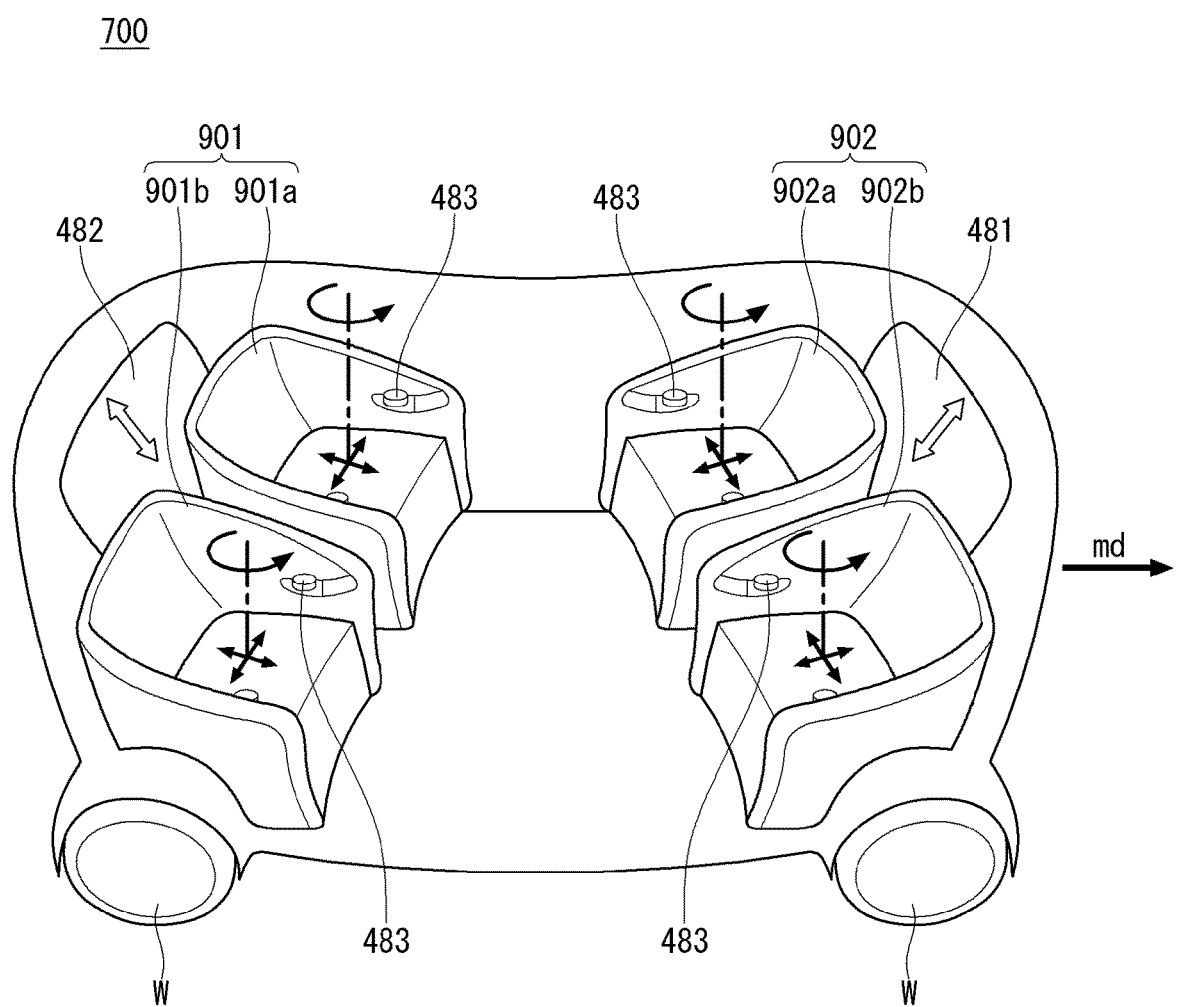

FIGS. 5 to 7 are views showing an example of handing over control of driving a vehicle 700.

Referring to FIG. 5, the vehicle 700 may drive autonomously. Driving modes of the vehicle 700 may include a manual driving mode, a semi-autonomous driving mode, an autonomous driving mode, etc. The manual driving mode may mean that the vehicle 700 is driven by the driver's operation. The autonomous driving mode may mean that the vehicle 700 is driven without the driver's operation. The autonomous driving mode also may be referred to as an automated driving mode. The semi-autonomous driving mode may mean that part of the driving of the vehicle 700 is done by the driver's operation and the rest of the driving of the vehicle 700 is done without the driver's operation. Alternatively, the processor 470 may control the driving of the vehicle 700 taking control of itself (S510). The control of driving may include at least one among steering control of the vehicle 700, acceleration control of the vehicle 700, brake control of the vehicle 700, light control of the vehicle 700, and wiper control of the vehicle 700.

While controlling the driving of the vehicle taking control of itself, the processor 470 may determine if there is a need to hand over control of driving to a passenger (S520). Once a passenger takes over control of driving, the driving mode of the vehicle 700 may be changed to the semi-autonomous driving mode or the manual driving mode.

Upon detecting a glitch in a sensor for acquiring information on the surroundings of the vehicle 700, the processor 470 may determine that there is a need to hand over control of driving to a passenger.

Alternatively, upon receiving from an external server a command to hand over control of driving to a passenger, the processor 470 may determine that there is a need to hand over control of driving to a passenger. The external server may be a control center server. Alternatively, a handover command inputted from a remote control terminal may be received over a network.

The processor 470 may select at least one passenger to whom control of driving may be handed over (S530). There may be a plurality of passengers. A passenger to whom control of driving may be handed over may be selected based on at least one of the following: whether the passenger has a driver's license, whether the passenger is drunk, the passenger's driving experience, whether the passenger is sleeping, and whether the passenger is on the phone. For example, if the passenger has no driver's license or is in a slumber, the processor 470 may determine that he or she cannot take over control of driving. For example, if the passenger is drunk or the passenger's blood alcohol content is above a preset level, the processor 470 may determine that he or she cannot take over control of driving. For example, if the passenger is sleeping, the processor 470 may determine that the passenger cannot take over control of driving.

For example, if the passenger is on the phone, the processor 470 may determine that the passenger cannot take over control of driving.

The processor 470 may determine an order of priority in handing over control of driving by taking into consideration at least one selected passenger's occupancy state information (S540). The order of priority in handing over control of driving may be determined based on at least one of the following: each passenger's driving experience, each passenger's seating position, the direction each passenger is looking at, whether each passenger is sleeping, and each passenger's history of accidents. For example, the more driving experience the passenger has, the higher priority the processor 470 assigns. For example, the processor 470 may determine that a passenger sitting in a forward-facing seat, a passenger sitting in a backward-facing seat, and a passenger sitting in a sideways-facing seat, all relative to the direction (md) of travel of the vehicle 700, may be given priority in the order mentioned. For example, the closer to the direction of travel (md) of the vehicle 700 the passenger is looking, the higher priority the processor 470 gives. For example, the processor 470 may give a high priority to a passenger who is not sleeping. For example, the less the number of accidents while driving, the higher priority the processor 470 gives.

The processor 470 may hand over control of driving to a top priority passenger who is determined according to the order of priority (S550). Once control of driving is handed over to the top priority passenger, the processor 470 may output a driving control handover notification to the top priority passenger. The notification may be an image display through the display unit 480, an audio output through the audio output unit 485, or a vibration of the seat the top priority passenger is sitting in. If there is no feedback from the top priority passenger for a certain period of time after the top priority passenger takes over control of driving, the processor 470 may hand over control of driving to the next highest priority passenger and give a notification.

The processor 470 may control the driving environment by taking into consideration the top priority passenger's occupancy state information (S560). The occupancy state information may include at least one among the passenger's direction of gaze, the position or direction of the seat the passenger is sitting in, whether the passenger is sleeping, and the height of the passenger's gaze. The processor 470 may horizontally move or rotate the seat the passenger is sitting in. Alternatively, the processor 470 may adjust the angle or height of the seat the passenger is sitting in. Alternatively, the processor 470 may wake up a sleeping passenger by vibrating the seat the passenger is sitting in.

Referring to FIG. 6, the processor 470 may receive reserved input information from a passenger before the passenger gets in the vehicle 700. The passenger may enter reserved input information in the mobile terminal 600, and the processor 470 may receive the reserved input information from the mobile terminal 600.

The reserved input information may include at least one of the following: whether the passenger consents to take over control of driving, whether the passenger has a driver's license, whether the passenger is drunk, the passenger's driving experience, seat choice information, travel time, the time the passenger gets in the vehicle, the time the passenger gets out of the vehicle, the location where the passenger gets in the vehicle, and the location where the passenger gets out of the vehicle. If the passenger does not consent to take over control of driving, the processor 470 may exclude him or her from passengers to whom control of driving may be handed over.

If there is no passenger to which control of driving may be handed over, the processor 470 may bring the vehicle 700 to an emergency stop. For example, the processor 470 may park or stop the vehicle 700 on a sidewalk. The processor 470 may receive information from the traffic information server or control center server in order to bring the vehicle 700 to an emergency stop. After bringing the vehicle 700 to an emergency stop, the processor 470 may indicate an emergency situation or turn on emergency lights. The processor 470 may send a tow request or a call for service to the control center server.

Referring to FIG. 7, forward-facing seats 901 and backward-facing seats 902 may be installed relative to the direction (md) of travel of the vehicle 700. For convenience of explanation, the following description will be given on the assumption that the direction (md) of travel of the vehicle 700 is forward and the opposite direction to the direction (md) of travel of the vehicle 700 is backward. The control unit 483 may be installed on every seat 901*a*, 901*b*, 902*a*, and 902*b*. A plurality of displays 481 and 482 may be provided, and may be installed on the front and back of the vehicle 700, respectively. The front display 481 may be installed ahead of the backward-facing seats 902, and the back display 482 may be installed behind the forward-facing seats 901. The displays 481 and 482 may be moved or slid vertically. The front display 481 may display an image toward the back, and the back display 482 may display an image toward the front.

The processor 470 may receive information from a passenger in the vehicle 700, in order to find out whether the passenger can take over control of driving or in order to acquire the passenger's occupancy state information. Alternatively, the processor 470 may receive information from a passenger through images displayed on the displays, audio output, voice reception, and so on. In this case, a breath-testing device and a breath test reading database may be used in order to identify if the passenger is drunk or not. In this case, a passenger image sensing database may be used in order to identify if the passenger is drunk or sleeping in the vehicle 700. In this case, a seat occupancy sensor, a safety belt tension sensor, and a passenger seat occupancy-related database may be used in order to identify the position of the seat the passenger is sitting in.

The processor 470 may perform a breath test after obtaining consent from a passenger. For example, the processor 470 may perform a breath test if the passenger consents to taking a breath test, and may view the passenger as incapable of taking over control of driving if the passenger's blood alcohol content is above 0.05%.

The processor 470 may wake up a sleeping passenger by vibrating the seat the passenger is sitting in, in order to hand over control of driving to the passenger.

FIGS. 8 to 11 show an example in which a passenger sitting in a forward-facing seat relative to the direction (md) of travel of the vehicle 700 takes over control of driving.

Figure 8:
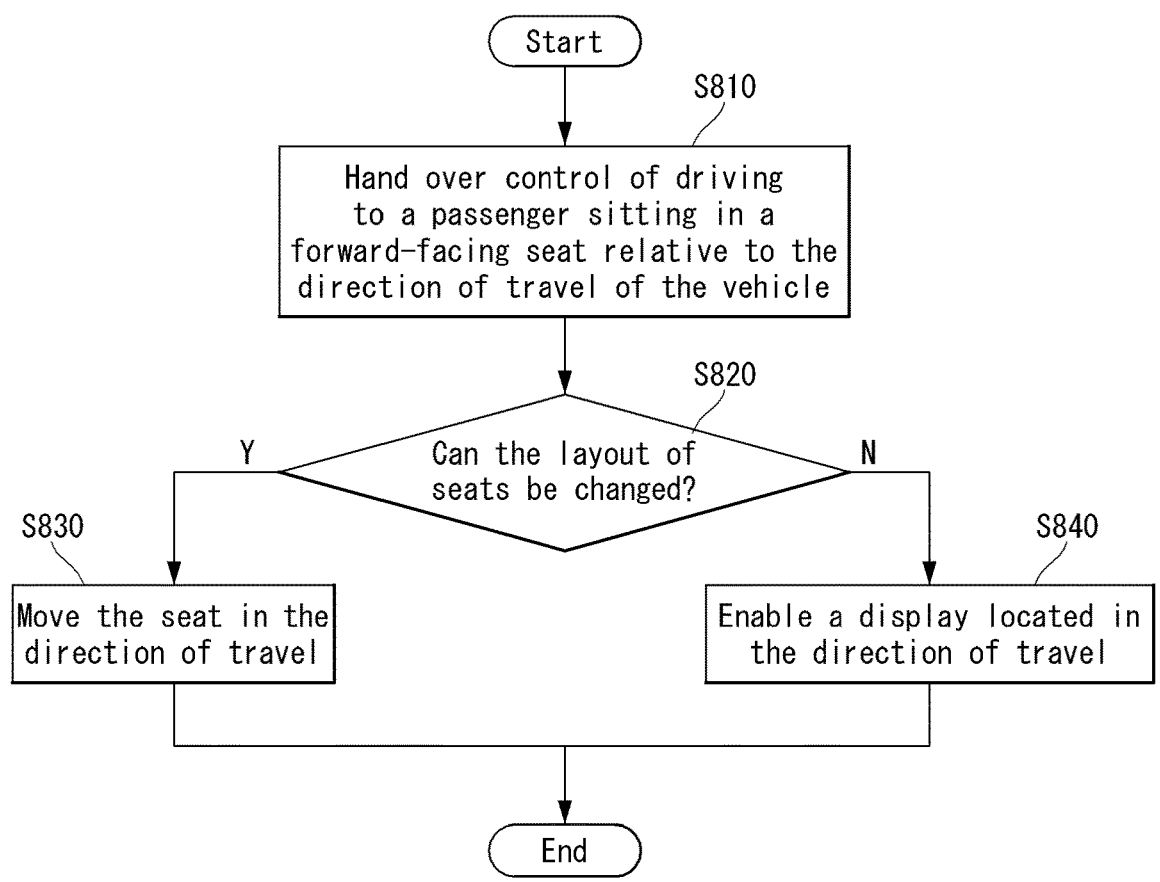
FIGS. 8 to 11 show an example in which a passenger sitting in a forward-facing seat relative to the direction of travel of the vehicle takes over control of driving.

Referring to FIG. 8, the processor 470 may hand over control of driving to a passenger sitting in a forward-facing seat relative to the direction (md) of travel of the vehicle 700 (S810).

The processor 470 may determine whether the layout of seats can be changed (S820). For example, the processor 470 may determine that the layout of seats cannot be changed due to a thing or person within the vehicle 700.

If it is determined that the layout of seats can be changed, the processor 470 may move the forward-facing seat toward the front display 481 or a front window (S830). In this case, the processor 470 may disable the front display 481 or move it downward to keep it from blocking the passenger's view.

If it is determined that the layout of seats cannot be changed, the processor 470 may enable the front display 481, or may move it upward and then enable it. The processor 470 may display information on the surroundings of the vehicle 700 on the front display 481. The information on the surroundings of the vehicle 700 may be surrounding video or images of the direction of travel of the vehicle 700 (S840).

Figure 9:
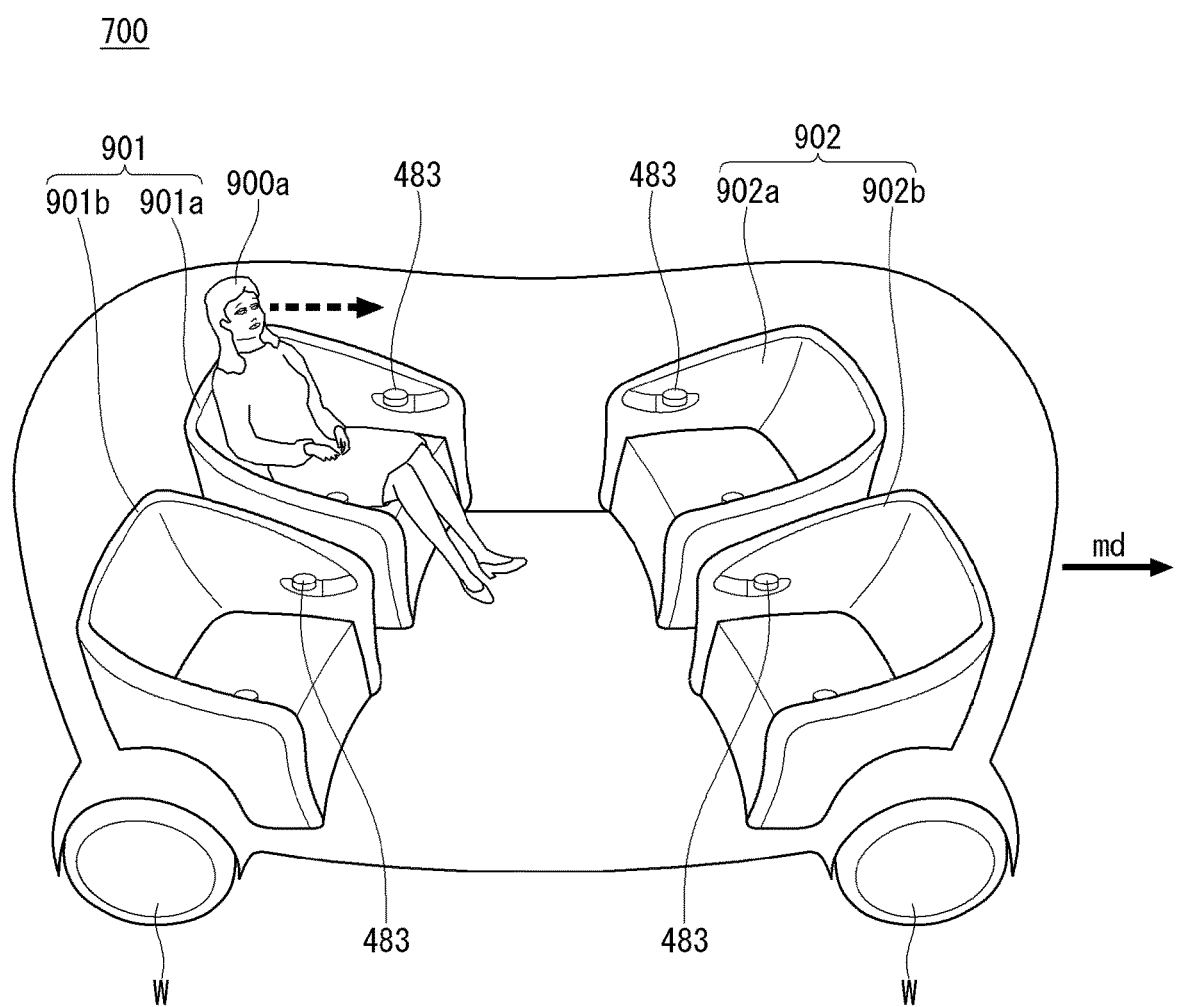

Referring to FIG. 9, a passenger 900a may sit in the forward-facing seat 901a. The passenger 900a may look forward. The processor 470 may determine whether the layout of seats can be changed, when handing over control of driving to the passenger 900a.

Figure 10:
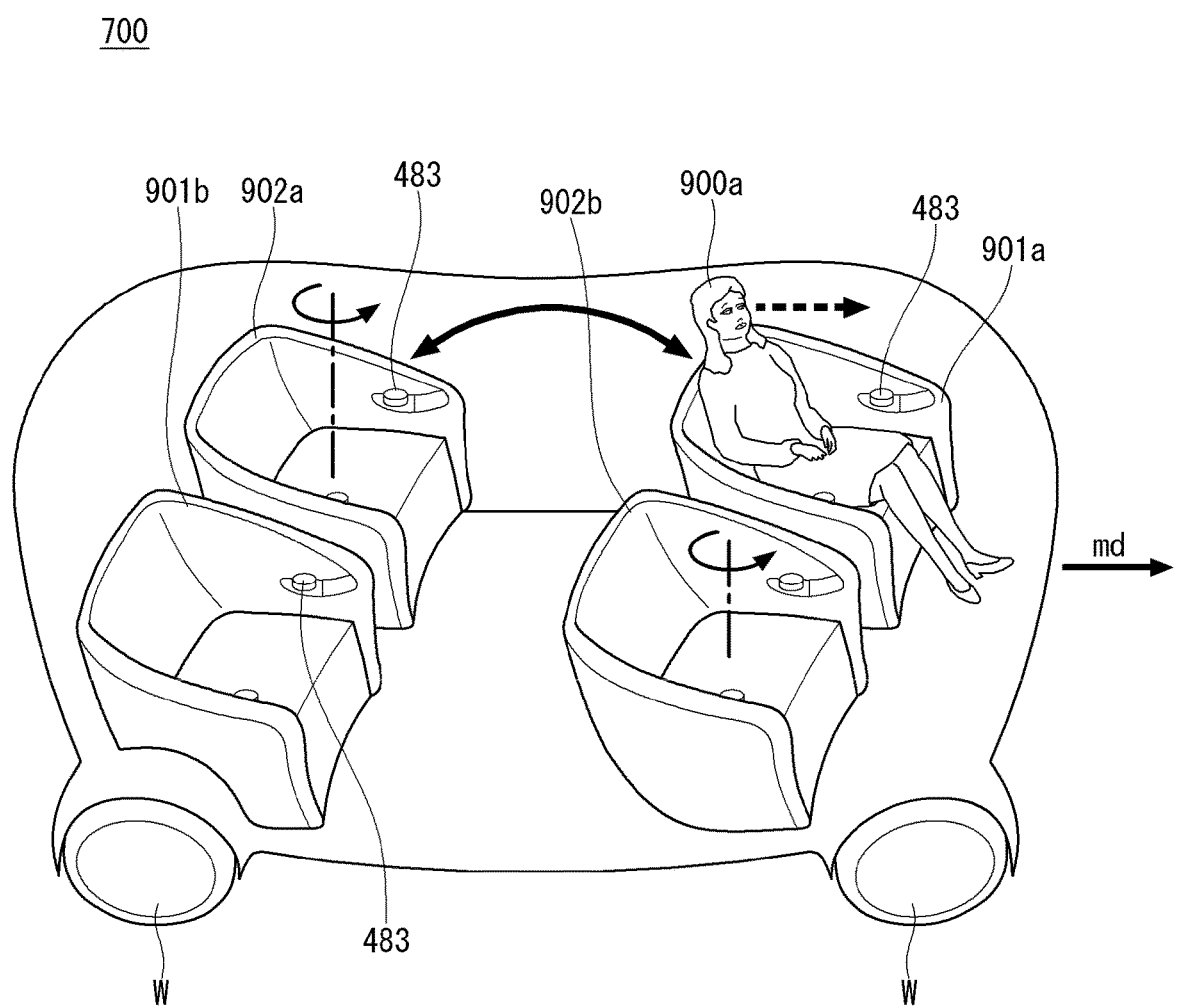

Referring to FIG. 10, in a case where control of driving is handed over to the passenger 900a and the layout of seats can be changed, the processor 470 may move the forward-facing seat 901a forward. In this case, the processor 470 may move the backward-facing seat 902a backward. Alternatively, the processor 470 may switch the positions of the forward-facing seat 901a and backward-facing seat 902a. The backward-facing seat 902a may be moved backward and rotated. The backward-facing seat 902a may face forward after its position is moved.

Alternatively, if the passenger 900a is sitting in the forward-facing seat 901b, the processor 470 may switch the positions of the forward-facing seats 901a and 901b. After switching the positions of the forward-facing seats 901a and 901b, the processor 470 may move the forward-facing seat 901b forward.

The processor 470 may switch the positions of the forward-facing seats 901a and 901b by moving them in a left and right direction.

The passenger 900a may enter control information for controlling the driving of the vehicle 700 through the control unit 483, and the processor 470 may control the vehicle 700 by receiving input from the passenger 900a through the control unit 483.

Figure 11:
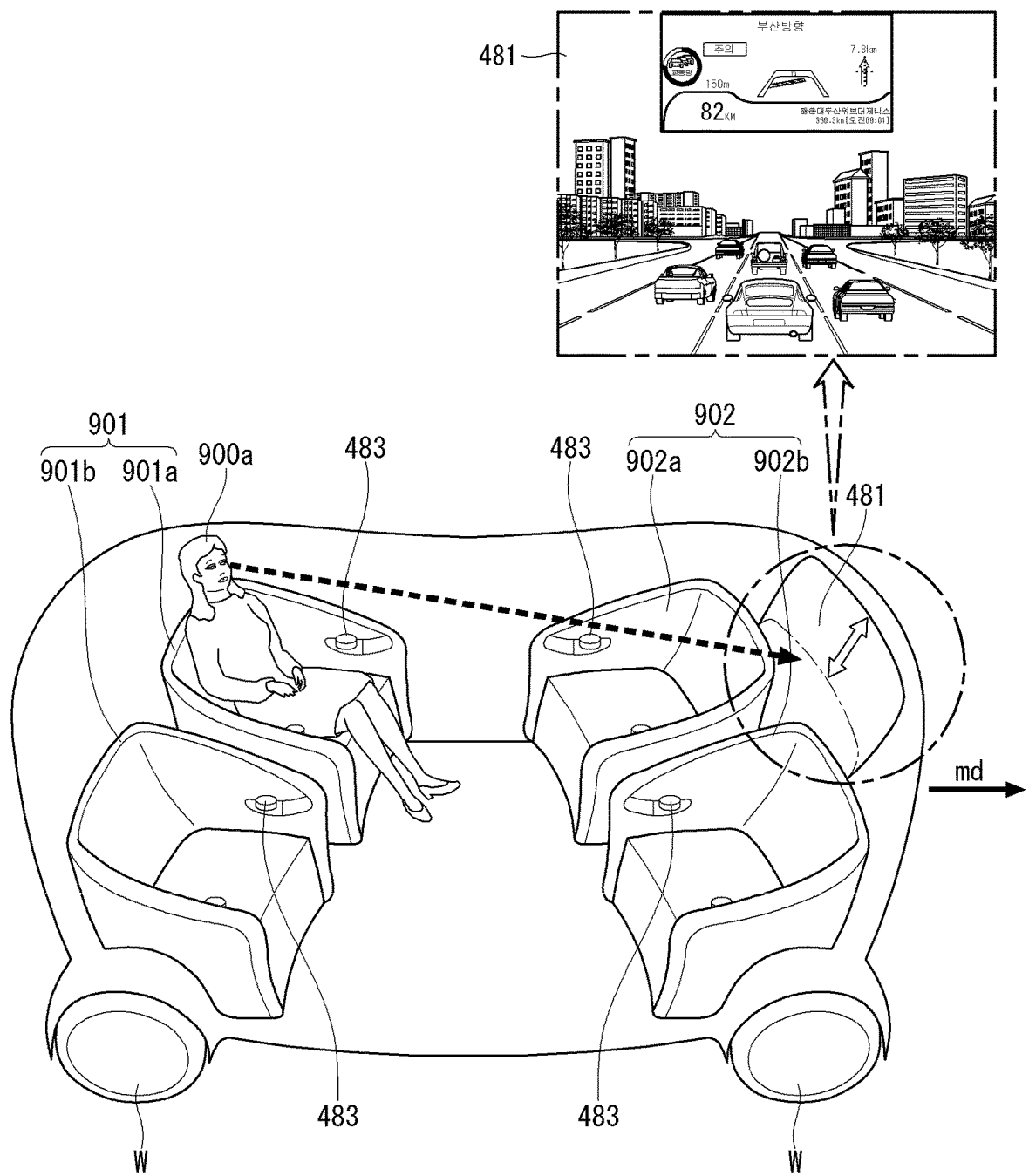

Referring to FIG. 11, in a case where control of driving is handed over to the passenger 900a and the layout of seats can be changed, the processor 470 may enable the front display 481 or may move the front display 481 upward and then enable it. The processor 470 may display information on the surroundings of the vehicle 700 on the front display 481. The information on the surroundings of the vehicle 700 may surrounding video or images of the direction of travel of the vehicle 700. Alternatively, the front display 481 may display information required for the passenger 900a to control the vehicle 700.

The passenger 900a may enter control information for controlling the driving of the vehicle 700 through the control unit 483, and the processor 470 may control the vehicle 700 by receiving input from the passenger 900a through the control unit 483.

FIGS. 12 to 15 show an example in which a passenger sitting in a backward-facing seat relative to the direction (md) of travel of the vehicle 700 takes over control of driving.

Figure 12:
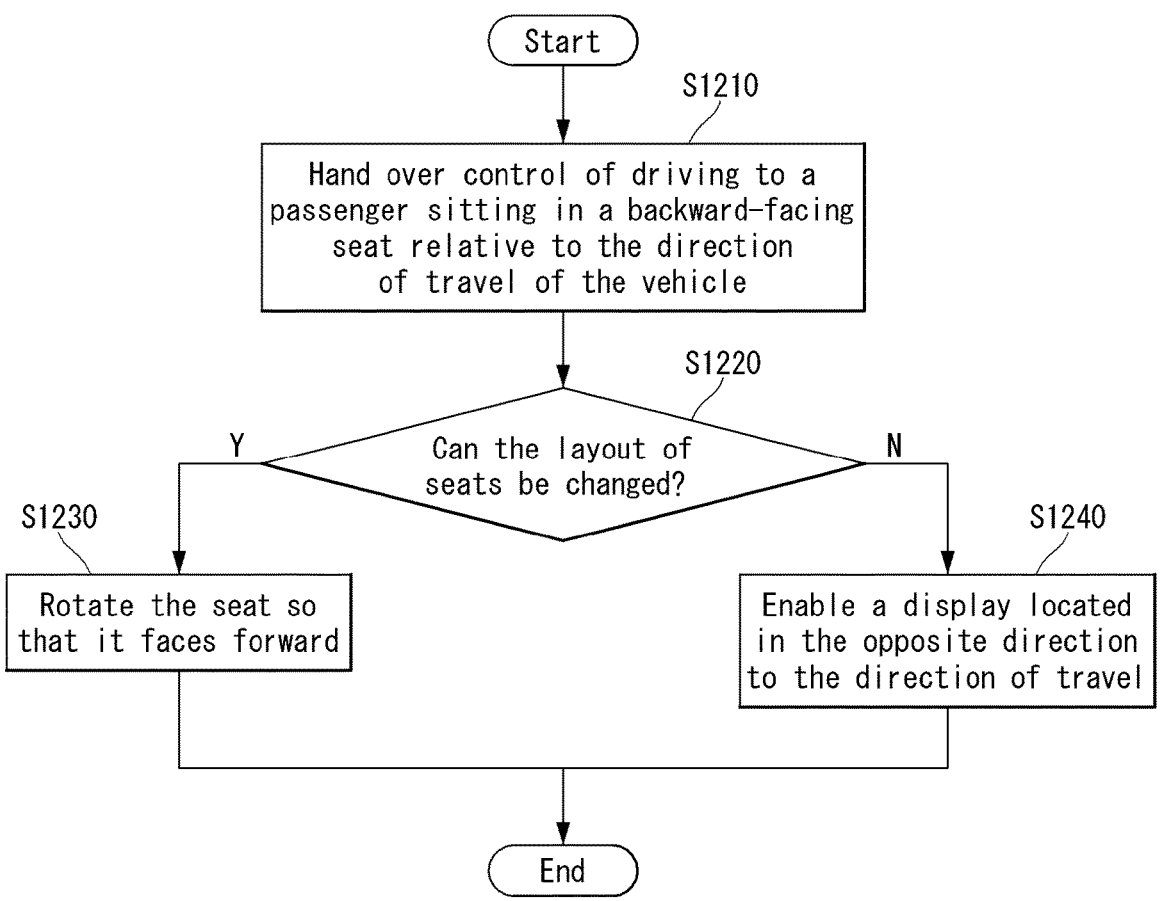
FIGS. 12 to 15 show an example in which a passenger sitting in a backward-facing seat relative to the direction of travel of the vehicle takes over control of driving.

Referring to FIG. 12, the processor 470 may hand over control of driving to a passenger sitting in a backward-facing seat relative to the direction (md) of travel of the vehicle 700 (S1210).

The processor 470 may determine whether the layout of seats can be changed (S1220). For example, the processor 470 may determine that the layout of seats cannot be changed due to a thing or person within the vehicle 700.

If it is determined that the layout of seats can be changed, the processor 470 may rotate the backward-facing seat so that it faces forward (S1230). In this case, the processor 470 may disable the front display 481 or move it downward to keep it from blocking the passenger's view.

If it is determined that the layout of seats cannot be changed, the processor 470 may enable the back display 482 or may move it upward and then enable it. The processor 470 may display information on the surroundings of the vehicle 700 or an image corresponding to the direction (md) of travel of the vehicle 700 on the back display 482. The information on the surroundings of the vehicle 700 may be surrounding video or images of the direction of travel of the vehicle 700 (S1240).

Figure 13:
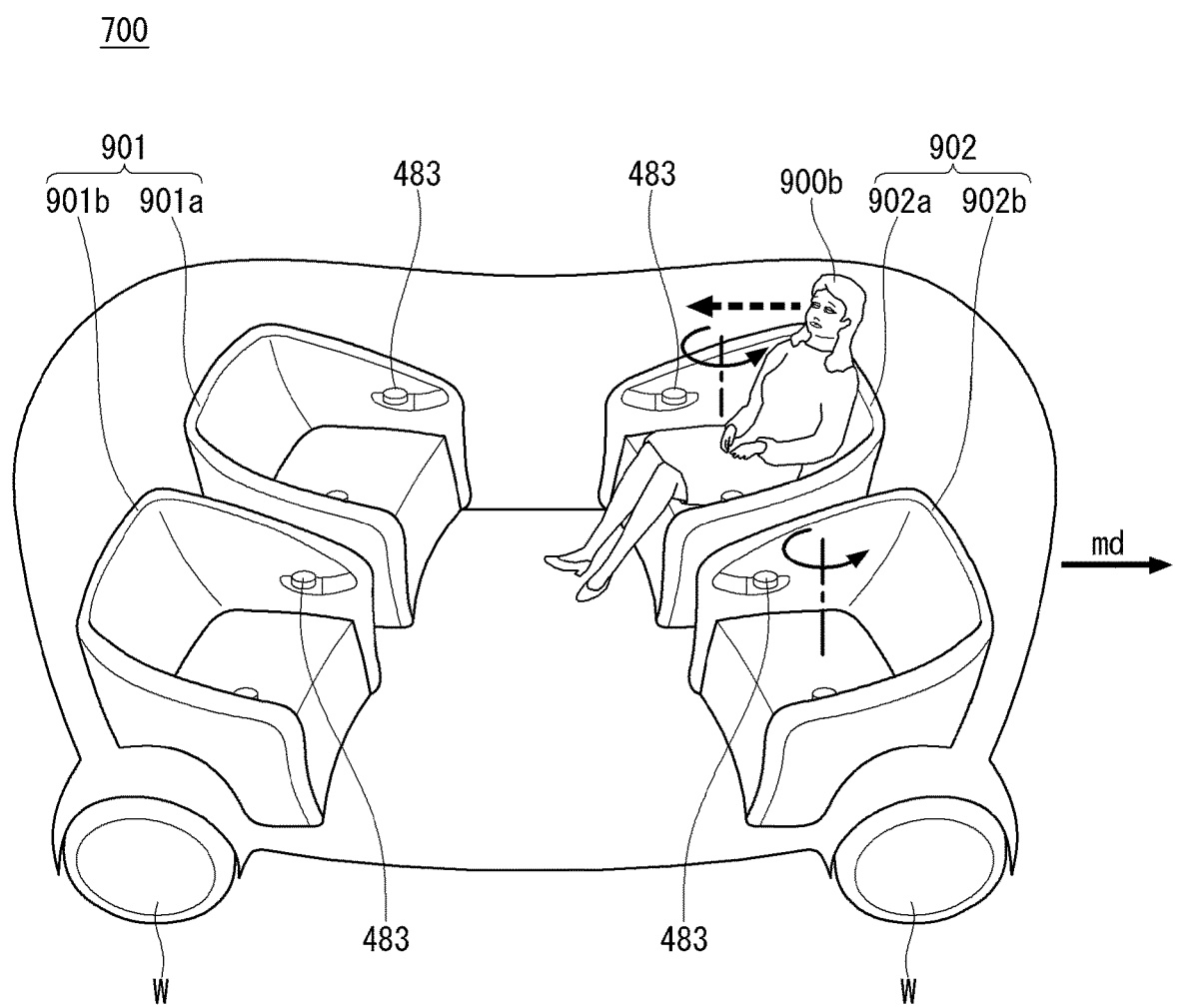

Referring to FIG. 13, a passenger 900b may sit in the backward-facing seat 902a. The passenger 900b may look backward. The processor 470 may determine whether the layout of seats can be changed, when handing over control of driving to the passenger 900b.

If the layout of seats cannot be changed, the processor 470 may guide the passenger 900b to sit in the forward-facing seat 901a or 901b.

The guidance may be an image display through the display unit 480, an audio output through the audio output unit 485, or a vibration of the backward-facing seat 902a.

Figure 14:
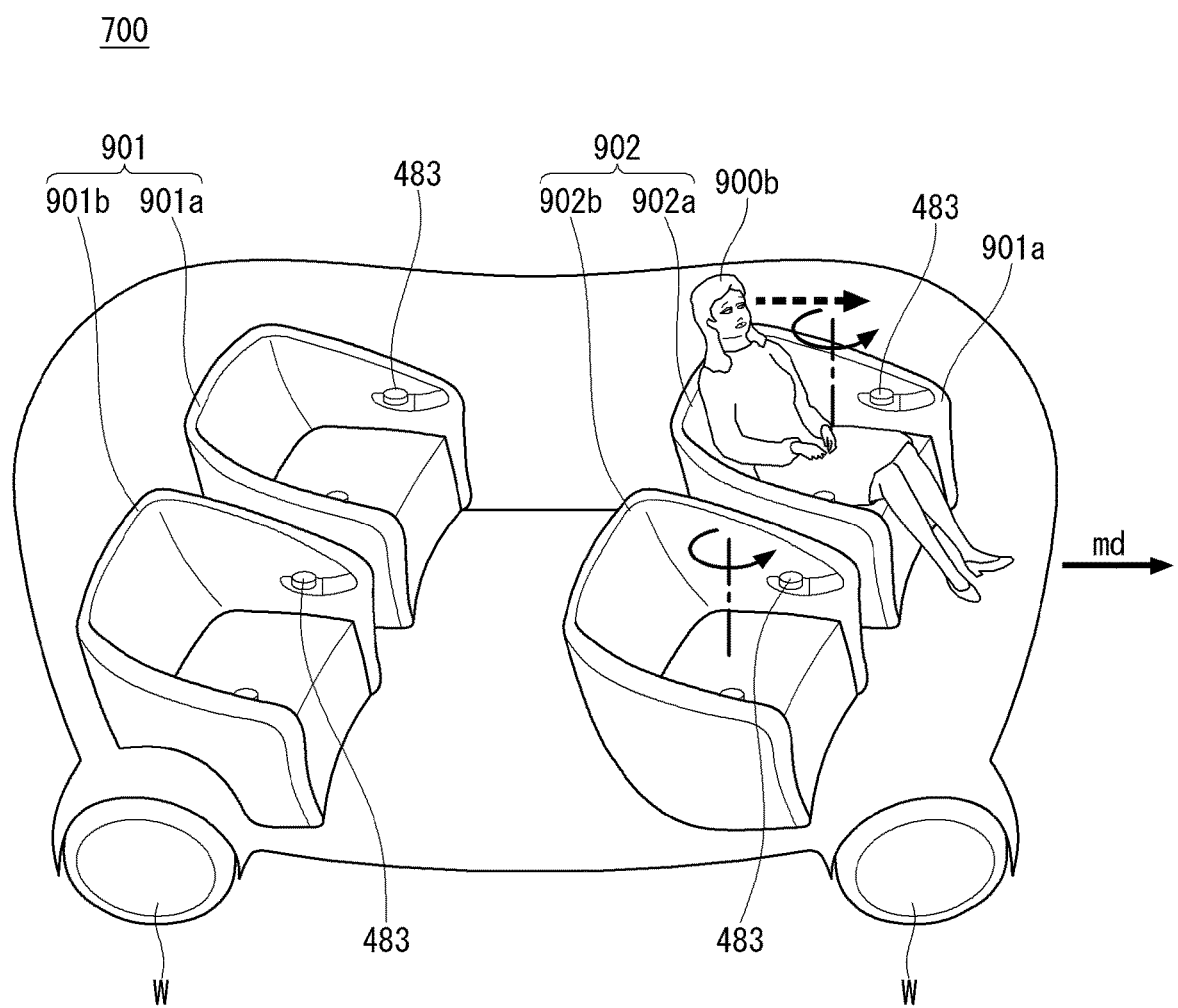

Referring to FIG. 14, in a case where control of driving is handed over to the passenger 900b and the layout of seats can be changed, the processor 470 may rotate the backward-facing seats 902a and 902b. The backward-facing seats 902a and 902b may be rotated individually.

The passenger 900b may enter control information for controlling the driving of the vehicle 700 through the control unit 483, and the processor 470 may control the vehicle 700 by receiving input from the passenger 900b through the control unit 483.

In this case, the processor 470 may disable the front display 481 or move it downward to keep it from blocking the passenger 900b's view.

Figure 15:
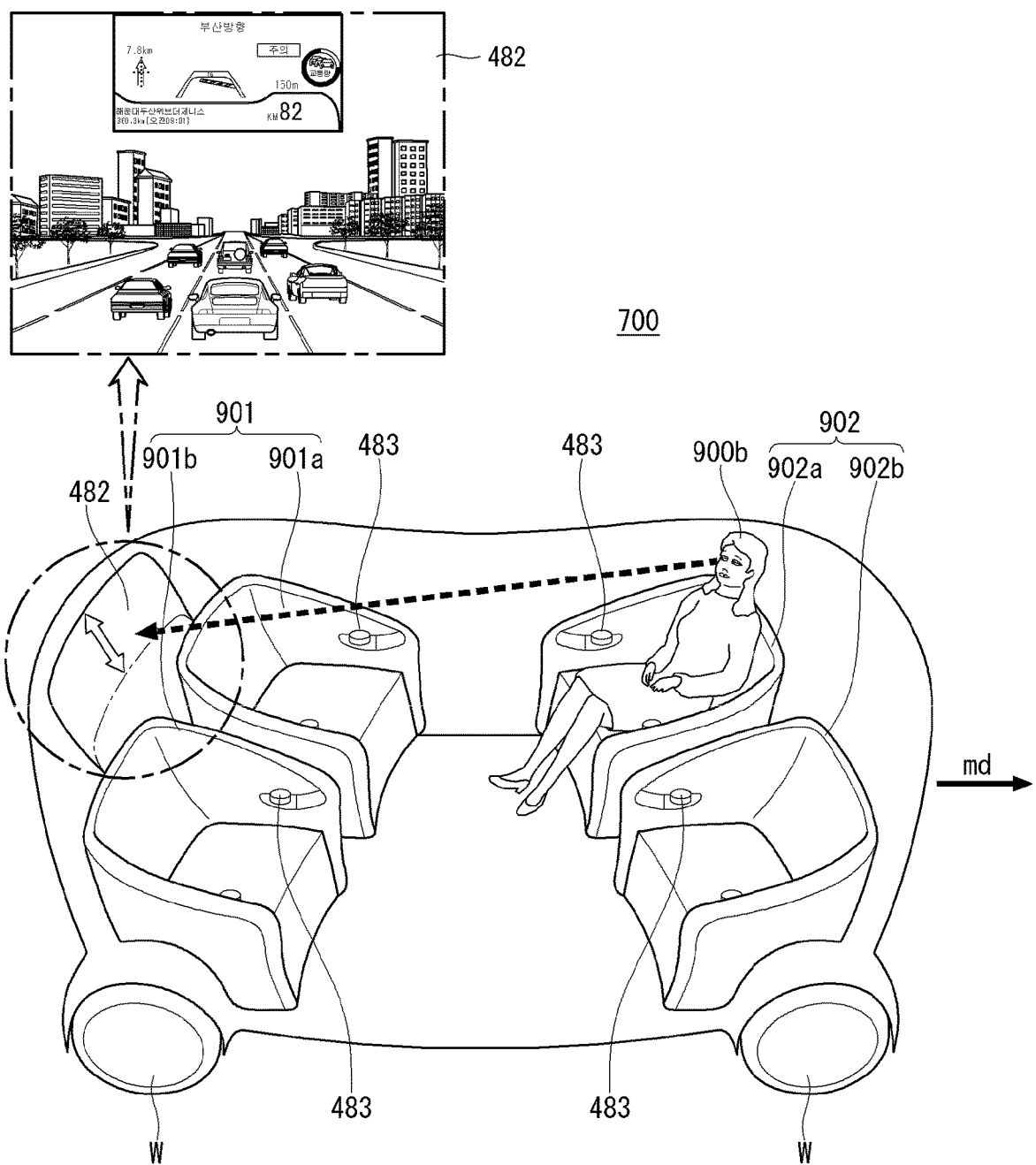

Referring to FIG. 15, in a case where control of driving is handed over to the passenger 900b and the layout of seats can be changed, the processor 470 may enable the back display 482 or may move the back display 482 upward and then enable it. The processor 470 may display information on the surroundings of the vehicle 700 on the back display 482. The information on the surroundings of the vehicle 700 may surrounding video or images of the direction of travel of the vehicle 700. Alternatively, the back display 482 may display information required for the passenger 900b to control the vehicle 700.

Figure 16:
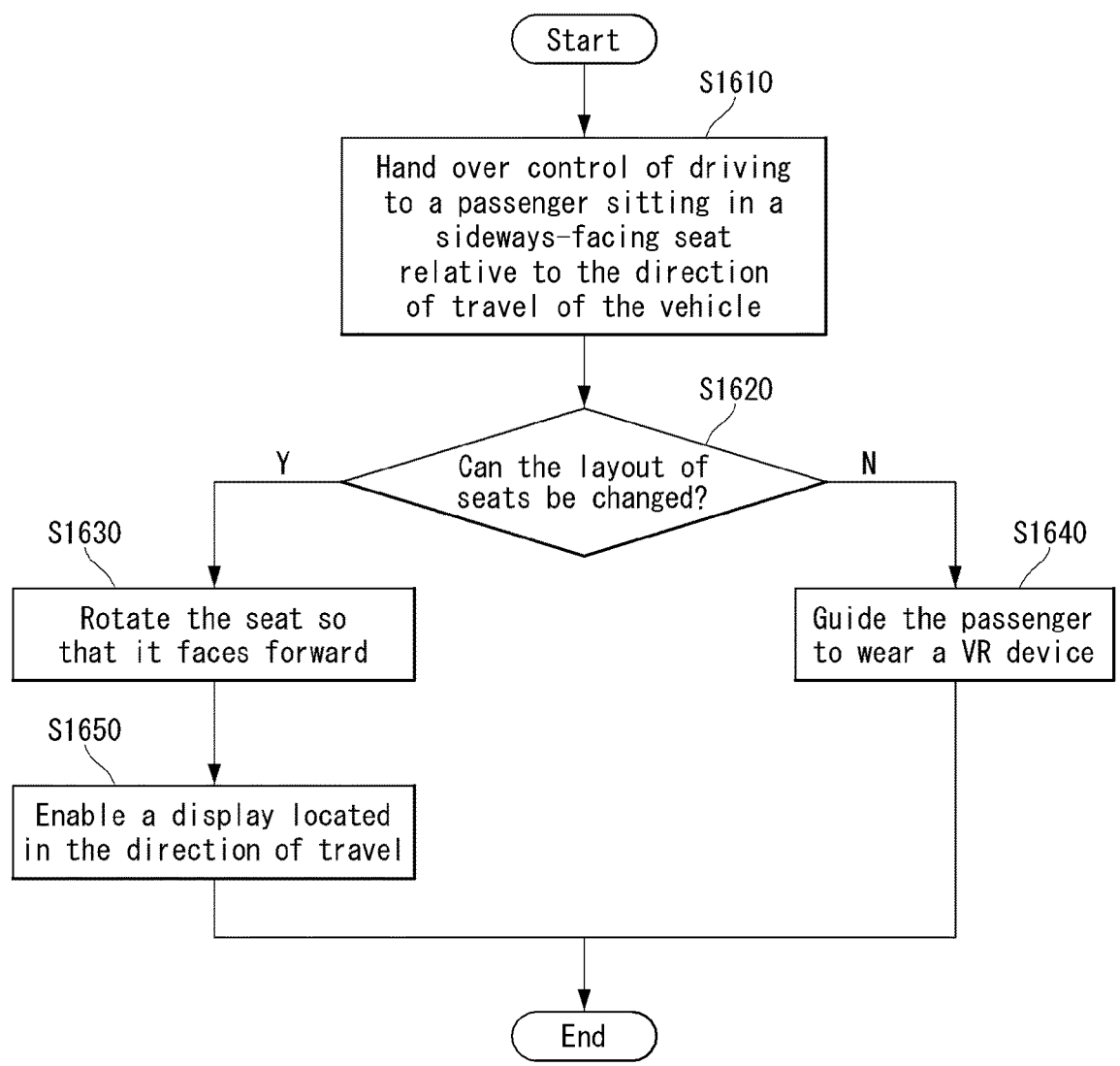
FIGS. 16 and 17 show an example in which a passenger sitting in a sideways-facing seat relative to the direction of travel of the vehicle takes over control of driving.
Figure 17:
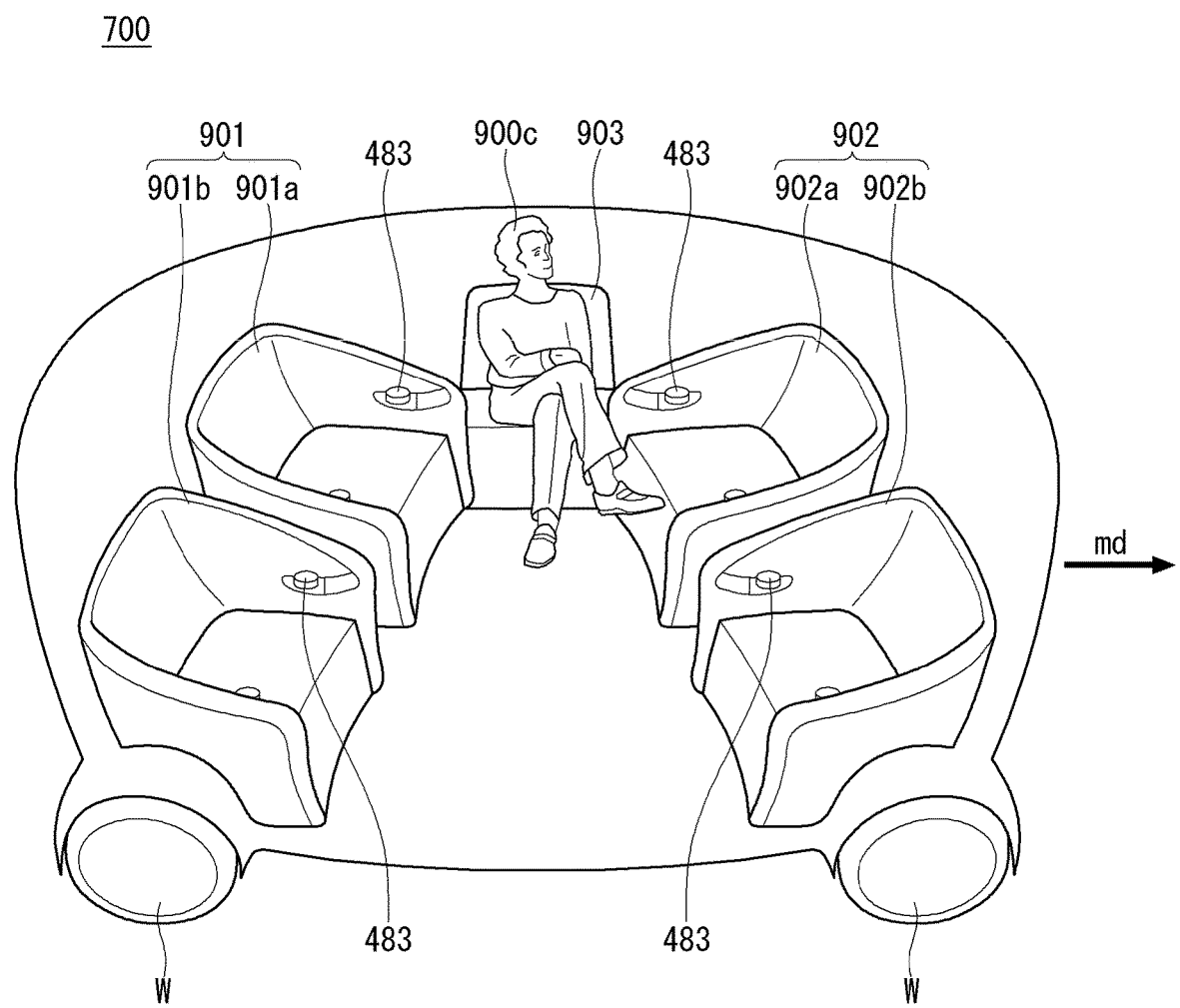

FIGS. 16 and 17 show an example in which a passenger sitting in a sideways-facing seat relative to the direction (md) of travel of the vehicle 700 takes over control of driving.

Referring to FIG. 16, the processor 470 may hand over control of driving to a passenger sitting in a sideways-facing seat relative to the direction (md) of travel of the vehicle 700 (S1610).

The processor 470 may determine whether the layout of seats can be changed (S1620). For example, the processor 470 may determine that the layout of seats cannot be changed due to a thing or person within the vehicle 700.

If it is determined that the layout of seats can be changed, the processor 470 may rotate the sideways-facing seat so that it faces forward (S1630). In this case, the processor 470 may disable the front display 481 or move it downward to keep it from blocking the passenger's view (S1650).

If it is determined that the layout of seats cannot be changed, the processor 470 may guide the passenger to wear a VR device 732 (S1640). The VR device 732 may be provided in the vehicle 700. The passenger may wear the VR device 732. The passenger may see an image displayed by the VR device 732 by wearing the VR device 732.

The VR device 732 may display information on the surroundings of the vehicle 700 or an image corresponding to the direction (md) of travel of the vehicle 700. The information on the surroundings of the vehicle 700 may be surrounding video or images of the direction of travel of the vehicle 700. The VR device 732 may display information required for the passenger to control the vehicle 700.

Referring to FIG. 17, a passenger 900c may sit in a sideways-facing seat 903. The passenger 900c may look sideways. The processor 470 may determine whether the layout of seats can be changed, when handing over control of driving to the passenger 900c.

In a case where control of driving is handed over to the passenger 900c and the layout of seats can be changed, the processor 470 may rotate the sideways-facing seat 903. The control unit 483 may be provided on the sideways-facing seat 903. The passenger 900c may enter control information for controlling the driving of the vehicle 700 through the control unit 483, and the processor 470 may control the vehicle 700 by receiving input from the passenger 900c through the control unit 483. In this case, the processor 470 may disable the front display 481 or move it downward to keep it from blocking the passenger's view.

If the layout of seats cannot be changed, the processor 470 may guide the passenger 900c to sit in the forward-facing seat 901a or 901b. The guidance may be an image display through the display unit 480, an audio output through the audio output unit 485, or a vibration of the backward-facing seat 902a.

If the layout of seats cannot be changed, the processor 470 may guide the passenger to wear the VR device 732. The VR device 732 may be provided or contained in the vehicle 700. The passenger may wear the VR device 732. The passenger may see an image displayed by the VR device 732 by wearing the VR device 732. The VR device 732 may display information on the surroundings of the vehicle 700 or an image corresponding to the direction (md) of travel of the vehicle 700. The information on the surroundings of the vehicle 700 may be surrounding video or images of the direction of travel of the vehicle 700. The VR device 732 may display information required for the passenger to control the vehicle 700.

Figure 18:
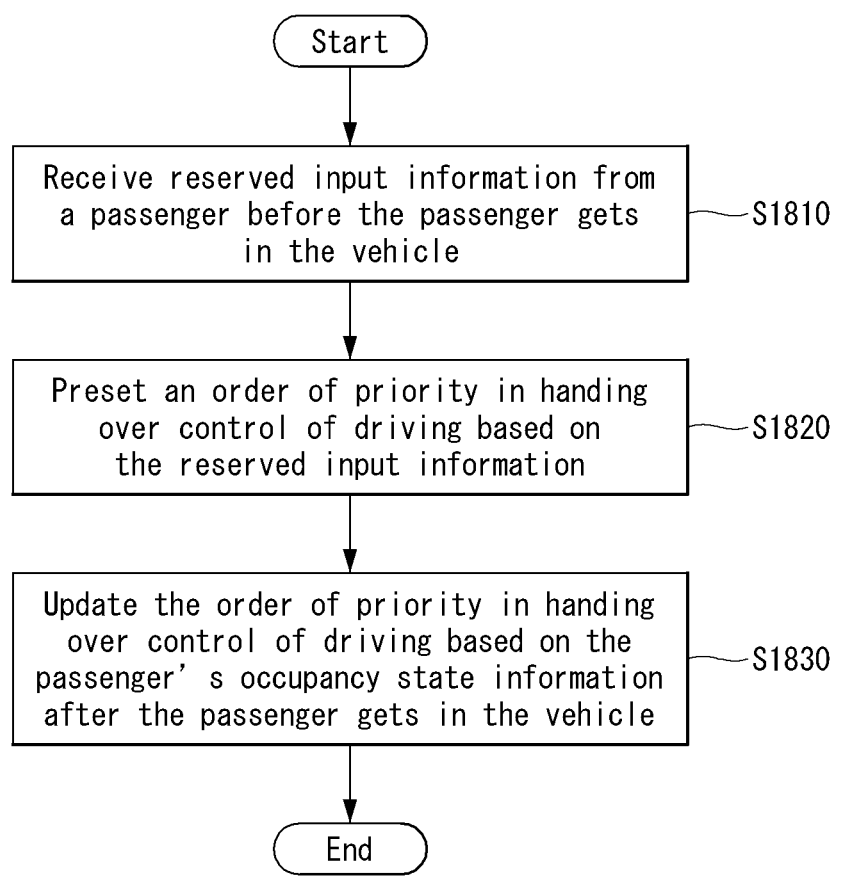
FIG. 18 shows an example in which an order of priority in handing over control of driving is set based on each passenger's reserved input information and the order of priority in handing over control of driving is updated based on each passenger's occupancy state information.

FIG. 18 shows an example in which an order of priority in handing over control of driving is set based on each passenger's reserved input information and the order of priority in handing over control of driving is updated based on each passenger's occupancy state information.

Referring to FIG. 18, the processor 470 may receive reserved input information from a passenger before the passenger gets in the vehicle 700 (S1810). The passenger may enter reserved input information in the mobile terminal 600. The processor 470 may receive the passenger's reserved input information from the mobile terminal 600 through the communication unit 420.

The processor 470 may preset an order of priority in handing over control of driving based on the reserved input information (S1820). Based on the reserved input information, the processor 470 may preset an order of priority in which a plurality of passengers take over control of driving by receiving at least one of the following: whether the passenger consents to take over control of driving, whether the passenger has a driver's license, whether the passenger is drunk, the passenger's driving experience, seat choice information, travel time, the time the passenger gets in the vehicle, the time the passenger gets out of the vehicle, the location where the passenger gets in the vehicle, and the location where the passenger gets out of the vehicle.

The processor 470 may update the order of priority in handing over control of driving based on the passenger's occupancy state information after the passenger gets in the vehicle 700 (S1830). After a passenger enters reserved input information into the mobile terminal 600, changes may be made until the passenger gets in the vehicle 700. For example, a passenger may drink alcohol or not get in the vehicle 700 after entering reserved input information into the mobile terminal 600. Alternatively, after a passenger gets in the vehicle 700, the passenger's reserved input information and the passenger's occupancy state information may not match. For example, if a passenger sits in a seat he or she did not reserve, the passenger refuses to take over control of driving after consenting to take over control of driving, the passenger has no reservation, the passenger gets out of the vehicle at a location other than an appointed location, or the passenger gets in the vehicle at a location other than an appointed location, the passenger's reserved input information and the passenger's occupancy state information may not match. The processor 470 may acquire occupancy state information of a passenger who gets in the vehicle 700 and change, modify, or update the order of priority in handing over control of driving.

FIGS. 19 to 22 show an example of a method in which a passenger gives control input for controlling the driving of the vehicle 700.

Figure 19:
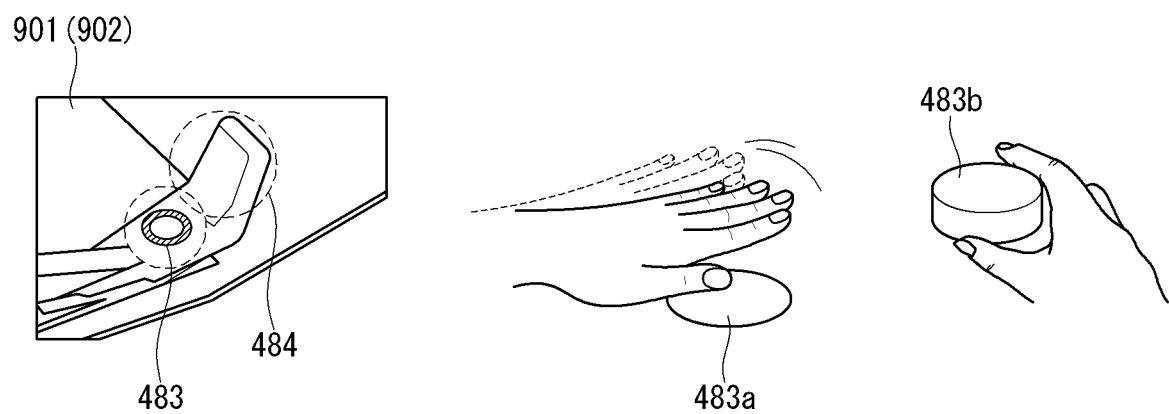
FIGS. 19 to 22 show an example of a method in which a passenger gives control input for controlling the driving of the vehicle.

Referring to FIG. 19, the control unit 483 may include a gesture receiver 483a or a jog dial 483b. The control unit 483 may be provided on one side of the seats 901 and 902. The seats 901 and 902 may be equipped with a button portion 484 or keypad 484 for controlling the driving of the vehicle 700.

For example, a passenger who has taken over control of driving may enter a gesture from above the gesture receiver 483*a*, and the processor 470 may control the driving of the vehicle 700 based on the passenger's gesture input.

For example, a passenger who has taken over control of driving may control the steering of the vehicle 700 by turning the jog dial 483*b*.

Figure 20:
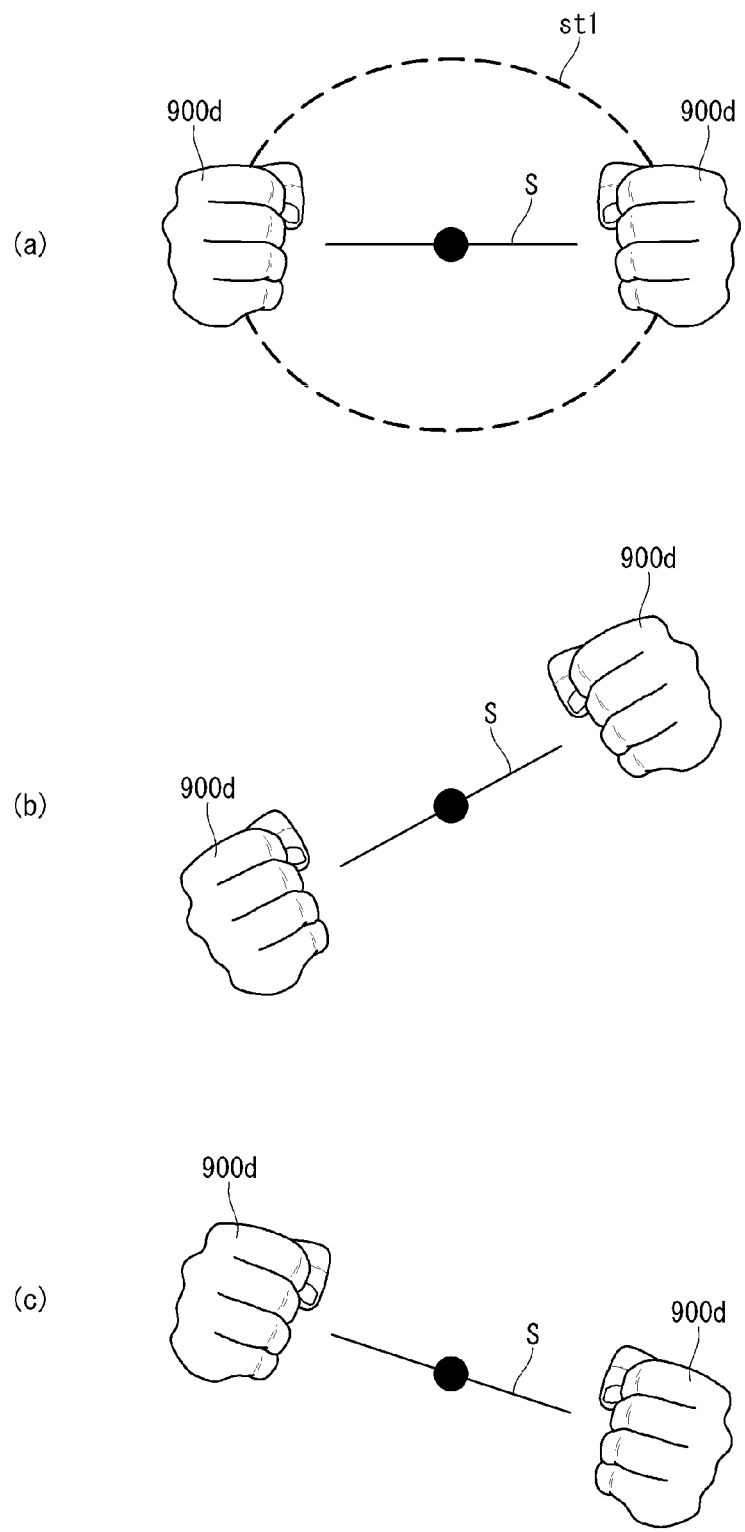

Referring to FIG. 20, the processor 470 may control the driving of the vehicle 700 based on a gesture input from a passenger who has taken over control of driving. The processor 470 may receive the passenger's gesture input through the camera 460 for capturing the inside of the vehicle 700. For example, referring to (a) of FIG. 20, a passenger may keep a certain distance between the two hands 900*d* with clenched fists. The processor 470 may set a virtual center point between the passenger's two hands 900*d*, and may set a virtual circle st1 that joins the passenger's two hands 900*d*. The virtual circle st1 may be called a virtual steering st1. A virtual straight line s that joins the passenger's two hands 900*d* may be called a virtual reference line s.

Referring to (b) and (c) of FIG. 20, the processor 470 may control the steering of the vehicle 700 based on the degree of rotation or tilt of the virtual reference line s. The passenger may control the steering of the vehicle 700 by rotating or tilting the two hands 900*d*.

In a case where a passenger sitting in the backward-facing seat 902 controls the vehicle 700 while viewing the back display 482, the passenger may control the steering of the vehicle 700 with reference to a video or image displayed on the back display 482. In this case, the processor 470 may control the steering of the vehicle 700 in a direction opposite to that of the passenger's steering input. For example, if the passenger sitting in the backward-facing seat 902 gives a right rotation input while viewing the back display 482, the processor 470 may control the vehicle 700 to rotate not to the left but to the right. This may be called reverse steering control.

Figure 21:
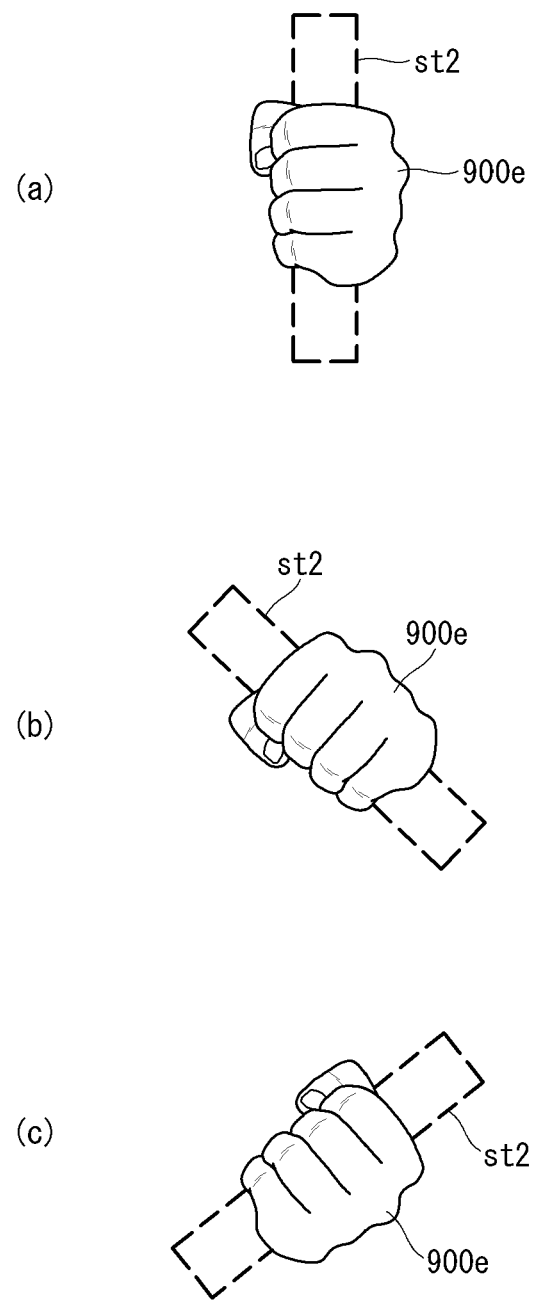

Referring to FIG. 21, the processor 470 may control the driving of the vehicle 700 based on a gesture input from a passenger who has taken over control of driving. The processor 470 may receive the passenger's gesture input through the camera 460 for capturing the inside of the vehicle 700.

For example, referring to (a) of FIG. 21, a passenger may clench one hand 900*e* into a fist. The processor 470 may set a virtual bar st2 relative to the passenger's first 900*e*. The virtual bar st2 may be called a virtual steering st2.

Referring to (b) and (c) of FIG. 21, the processor 470 may sense tilting or rotation of the virtual steering st2 as the first 900*e* tilts or rotates.

The processor 470 may control the steering of the vehicle 700 based on the degree of rotation or tilt of the virtual steering st2. The passenger may control the steering of the vehicle 700 by rotating or tilting the first 900*e*.

In a case where a passenger sitting in the backward-facing seat 902 controls the vehicle 700 while viewing the back display 482, the passenger may control the steering of the vehicle 700 with reference to a video or image displayed on the back display 482. In this case, the processor 470 may control the steering of the vehicle 700 in a direction opposite to that of the passenger's steering input. For example, if the passenger sitting in the backward-facing seat 902 gives a right rotation input while viewing the back display 482, the processor 470 may control the vehicle 700 to rotate not to the left but to the right. This may be called reverse steering control.

Figure 22:
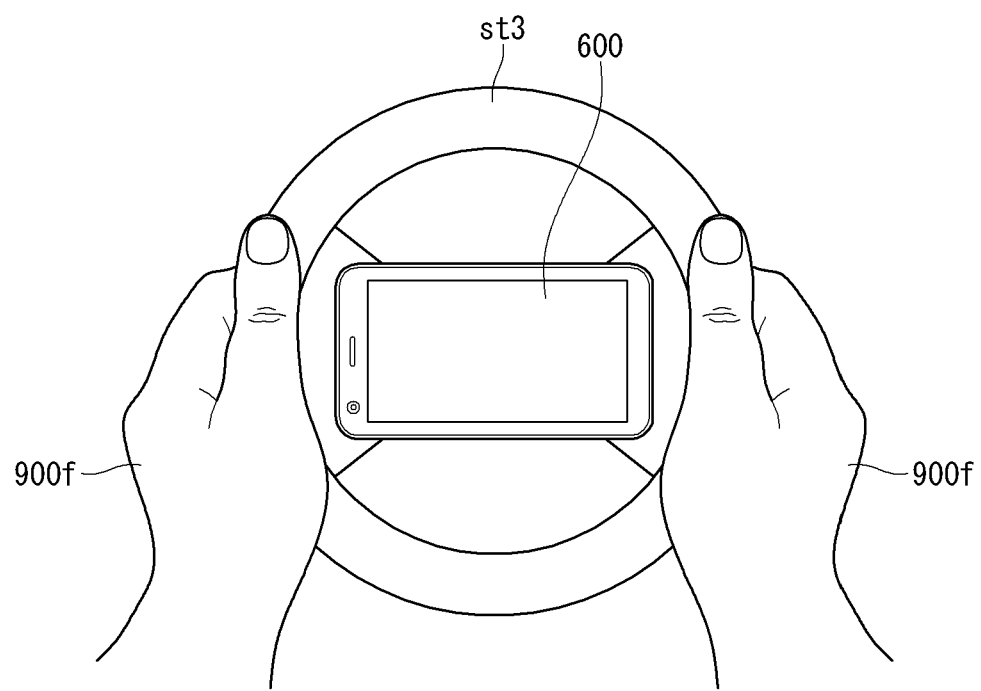

Referring to FIG. 22, the processor 470 may control the driving of the vehicle 700 based on the movement of the mobile terminal 600 of a passenger who has taken over control of driving. The processor 470 may receive the movement of the mobile terminal 600 of the passenger through the camera 460 for capturing the inside of the vehicle 700. Alternatively, the processor 470 may be connected to the mobile terminal 600 via wireless communication and receive the movement of the mobile terminal 600. For example, the passenger may hold both sides of the mobile terminal 600 with both hands 900*f*. The processor 470 may set a virtual center point on the passenger's mobile terminal 600, and may set a virtual circle st3 that joins the passenger's two hands 900*f* The virtual circle st3 may be called a virtual steering st3. The processor 470 may control the steering of the vehicle 700 based on the degree of rotation or tilt of the mobile terminal 600. The passenger may control the steering of the vehicle 700 by rotating or tilting the mobile terminal 600 with both hands.

Alternatively, the mobile terminal 600 may be connected to the physical steering st3. The mobile terminal 600 may be connected physically or via wireless communication to the physical steering st3. The passenger may control the driving of the vehicle 700 by manipulating the physical steering st3. The processor 470 may control the driving of the vehicle 700 by receiving a steering input value from the physical steering st3.

In a case where a passenger sitting in the backward-facing seat 902 controls the vehicle 700 while viewing the back display 482, the passenger may control the steering of the vehicle 700 with reference to a video or image displayed on the back display 482. In this case, the processor 470 may control the steering of the vehicle 700 in a direction opposite to that of the passenger's steering input. For example, if the passenger sitting in the backward-facing seat 902 gives a right rotation input while viewing the back display 482, the processor 470 may control the vehicle 700 to rotate not to the left but to the right. This may be called reverse steering control.

An exemplary embodiment of the present invention provides a vehicle control method including: while controlling the driving of a vehicle taking control of itself, determining if there is a need to hand over the control of driving to a passenger in the vehicle; if it is determined that there is a need to hand over the control of driving to a passenger in the vehicle, selecting at least one of passengers to whom the control of driving may be handed over; determining an order of priority in handing over the control of driving by taking into consideration the at least one selected passenger's occupancy state information; handing over the control of driving to a top priority passenger according to the order of priority; and controlling the driving environment by taking into consideration the top priority passenger's occupancy state information.

The control of driving may include control of at least one among steering control of the vehicle, acceleration control of the vehicle, brake control of the vehicle, light control of the vehicle, and wiper control of the vehicle.

Upon detecting a glitch in a sensor for acquiring information on the surroundings of the vehicle, it may be determined that there is a need to hand over the control of driving to a passenger in the vehicle.

Upon receiving from an external server a command to hand over the control of driving to a passenger in the vehicle, it may be determined that there is a need to hand over the control of driving to a passenger in the vehicle.

At least one passenger to whom the control of driving may be handed over may be selected based on at least one of the following: whether the passenger has a driver's license, whether the passenger is drunk, the passenger's driving experience, whether the passenger is sleeping, and whether the passenger is on the phone.

The vehicle control method may further include receiving reserved input information from the passenger before the passenger gets in the vehicle, wherein the reserved input information may include whether the passenger consents to take over the control of driving, and the at least one selected passenger may only include a passenger who consents to take over the control of driving.

The vehicle control method may further include, if there is no passenger to which the control of driving may be handed over, bringing the vehicle to an emergency stop.

The vehicle may include at least one among a forward-facing seat, a backward-facing seat, and a sideways-facing seat all relative to the direction of travel, and the order of priority in handing over the control of driving is: a passenger in the forward-facing seat; a passenger in the backward-facing seat; and a passenger in the sideways-facing seat.

The vehicle control method may further include, once the control of driving is handed over to the top priority passenger, outputting a driving control handover notification to the top priority passenger.

The vehicle control method may further include, upon detecting that the top priority passenger is sitting in a forward-facing seat relative to the direction of travel of the vehicle, enabling a display that covers a front window of the vehicle and displaying information on the surroundings of the vehicle on the display.

The vehicle control method may further include, upon detecting that the top priority passenger is sitting in a forward-facing seat relative to the direction of travel of the vehicle, moving the forward-facing seat in the direction of travel.

The vehicle control method may further include, upon detecting that the top priority passenger is sitting in a forward-facing seat relative to the direction of travel of the vehicle, moving the forward-facing seat in a left and right direction.

The vehicle control method may further include, upon detecting that the top priority passenger is sitting in a backward-facing seat or sideways-facing seat relative to the direction of travel of the vehicle, rotating the backward-facing seat so that the backward-facing seat or sideways-facing seat faces forward relative to the direction of travel of the vehicle.

The vehicle control method may further include, upon detecting that the top priority passenger is sitting in a backward-facing seat or sideways-facing seat relative to the direction of travel of the vehicle, guiding the top priority passenger to sit in a forward-facing seat relative to the direction of travel of the vehicle.

The vehicle control method may further include, upon detecting that the top priority passenger is sitting in a backward-facing seat relative to the direction of travel of the vehicle, displaying to the backward-facing seat an image corresponding to the direction of travel of the vehicle on a display installed in the opposite direction to the direction of travel of the vehicle.

The vehicle control method may further include, upon detecting that the top priority passenger is sitting in a sideways-facing seat relative to the direction of travel of the vehicle, guiding the top priority passenger to wear a VR (virtual reality device) provided within the vehicle.

The vehicle control method may further include controlling the driving of the vehicle based on a gesture input from the top priority passenger.

The vehicle control method may further include receiving reserved input information from the passenger before the passenger gets in the vehicle, wherein an order of priority in handing over the control of driving may be preset based on the reserved input information.

The reserved input information may include at least one of the following: whether the passenger consents to take over control of driving, whether the passenger has a driver's license, whether the passenger is drunk, the passenger's driving experience, seat choice information, travel time, the time the passenger gets in the vehicle, the time the passenger gets out of the vehicle, the location where the passenger gets in the vehicle, and the location where the passenger gets out of the vehicle.

The vehicle control method may further include updating the order of priority in handing over the control of driving based on the passenger's occupancy state information after the passenger gets in the vehicle.

The vehicle control device according to the foregoing exemplary embodiment may enhance passengers' convenience. The vehicle control device according to the foregoing exemplary embodiment may be used during autonomous driving or semi-autonomous driving of a vehicle.

The features, structures, and effects described in the above embodiments are included in at least one embodiment of the present invention, and are not necessarily limited to only one embodiment. Moreover, the features, structures, and effects described in the embodiments may also be combined or modified to be carried out in other embodiments by those skilled in the art to which the embodiments pertain. Thus, the contents related to the combination and modification shall be construed to be included in the scope of the present invention.

Further, although the embodiments have been mainly described until now, they are just exemplary and do not limit the present invention. Thus, those skilled in the art to which the present invention pertains will know that various modifications and applications which have not been exemplified may be carried out within a range which does not deviate from the essential characteristics of the embodiments. For example, the constituent elements described in detail in the exemplary embodiments can be modified to be carried out. Further, the differences related to such modifications and applications shall be construed to be included in the scope of the present invention specified in the attached claims.

The invention claimed is:
1. A vehicle control method comprising:
while controlling driving of a vehicle, determining whether there is a need to hand over the control of driving to a passenger in the vehicle;
selecting at least one of passengers to whom the control of driving may be handed over, based on a determination that there is a need to hand over the control of driving to a passenger in the vehicle;
determining an order of priority in handing over the control of driving by taking into consideration the at least one selected passenger's occupancy state information;
handing over the control of driving to a top priority passenger according to the order of priority; and
controlling a driving environment by taking into consideration the top priority passenger's occupancy state information, wherein the controlling of the driving environment comprises:

upon detecting that the top priority passenger is sitting in a sideways-facing seat relative to a direction of travel of the vehicle, guiding the top priority passenger to wear a VR (virtual reality) device provided within the vehicle.

2. The vehicle control method of claim 1, wherein the control of driving comprises control of at least one among steering control of the vehicle, acceleration control of the vehicle, brake control of the vehicle, light control of the vehicle, and wiper control of the vehicle.

3. The vehicle control method of claim 1, wherein, upon detecting a glitch in a sensor for acquiring information on the surroundings of the vehicle, it is determined that there is a need to hand over the control of driving to a passenger in the vehicle.

4. The vehicle control method of claim 1, wherein, upon receiving from an external server a command to hand over the control of driving to a passenger in the vehicle, it is determined that there is a need to hand over the control of driving to a passenger in the vehicle.

5. The vehicle control method of claim 1, wherein at least one passenger to whom the control of driving may be handed over is selected based on at least one of the following: whether the passenger has a driver's license, whether the passenger is drunk, the passenger's driving experience, whether the passenger is sleeping, and whether the passenger is on the phone.

6. The vehicle control method of claim 1, further comprising receiving reserved input information from the passenger before the passenger gets in the vehicle, wherein the reserved input information comprises whether the passenger consents to take over the control of driving, and the at least one selected passenger only comprises a passenger who consents to take over the control of driving.

7. The vehicle control method of claim 1, further comprising:

based on a determination that there is no passenger to which the control of driving may be handed over, bringing the vehicle to an emergency stop.

8. The vehicle control method of claim 1, wherein the vehicle comprises at least one among a forward-facing seat, a backward-facing seat, and a sideways-facing seat all relative to the direction of travel, and wherein the order of priority in handing over the control of driving is: a passenger in the forward-facing seat; a passenger in the backward-facing seat; and a passenger in the sideways-facing seat.

9. The vehicle control method of claim 1, further comprising, once the control of driving is handed over to the top priority passenger, outputting a driving control handover notification to the top priority passenger.

10. The vehicle control method of claim 1, further comprising, upon detecting that the top priority passenger is sitting in a forward-facing seat relative to the direction of travel of the vehicle, enabling a display that covers a front window of the vehicle and displaying information on the surroundings of the vehicle on the display.

11. The vehicle control method of claim 1, further comprising, upon detecting that the top priority passenger is sitting in a forward-facing seat relative to the direction of travel of the vehicle, moving the forward-facing seat in the direction of travel.

12. The vehicle control method of claim 1, further comprising, upon detecting that the top priority passenger is sitting in a forward-facing seat relative to the direction of travel of the vehicle, moving the forward-facing seat in a left and right direction.

13. The vehicle control method of claim 1, further comprising, upon detecting that the top priority passenger is sitting in a backward-facing seat or sideways-facing seat relative to the direction of travel of the vehicle, rotating at least one of the backward-facing seat and the sideways-facing seat such that the at least one faces forward relative to the direction of travel of the vehicle.

14. The vehicle control method of claim 1, further comprising, upon detecting that the top priority passenger is sitting in a backward-facing seat or sideways-facing seat relative to the direction of travel of the vehicle, guiding the top priority passenger to sit in a forward-facing seat relative to the direction of travel of the vehicle.

15. The vehicle control method of claim 1, further comprising, upon detecting that the top priority passenger is sitting in a backward-facing seat relative to the direction of travel of the vehicle, displaying to the backward-facing seat an image corresponding to the direction of travel of the vehicle on a display installed in the opposite direction to the direction of travel of the vehicle.

16. The vehicle control method of claim 1, further comprising controlling the driving of the vehicle based on a gesture input from the top priority passenger.

17. The vehicle control method of claim 1, further comprising receiving reserved input information from the passenger before the passenger gets in the vehicle, wherein an order of priority in handing over the control of driving is preset based on the reserved input information.

18. The vehicle control method of claim 17, wherein the reserved input information comprises at least one of the following: whether the passenger consents to take over control of driving, whether the passenger has a driver's license, whether the passenger is drunk, the passenger's driving experience, seat choice information, travel time, the time the passenger gets in the vehicle, the time the passenger gets out of the vehicle, the location where the passenger gets in the vehicle, and the location where the passenger gets out of the vehicle.

19. The vehicle control method of claim 17, further comprising updating the order of priority in handing over the control of driving based on the passenger's occupancy state information after the passenger gets in the vehicle.

* * * * *